United States Patent
Rensin et al.

(10) Patent No.: US 7,860,994 B2
(45) Date of Patent: Dec. 28, 2010

(54) SYSTEM AND METHOD FOR REMOTE DATA ACQUISITION AND DISTRIBUTION

(75) Inventors: David Kallet Rensin, Leesburg, VA (US); Tasuki Hirata, Ashburn, VA (US); David Joshua Kramer, Potomac, MD (US); Brian Joseph Geoghegan, Vienna, VA (US); Kevin John Winters, Alexandria, VA (US)

(73) Assignee: Reality Mobile LLC, Herndon, VA (US)

( * ) Notice: Subject to any disclaimer, the term of this patent is extended or adjusted under 35 U.S.C. 154(b) by 919 days.

(21) Appl. No.: 11/653,305

(22) Filed: Jan. 16, 2007

(65) Prior Publication Data

US 2007/0199076 A1     Aug. 23, 2007

Related U.S. Application Data

(60) Provisional application No. 60/758,983, filed on Jan. 17, 2006.

(51) Int. Cl.
*G06F 15/16* (2006.01)
*G06F 3/00* (2006.01)
*H04W 72/00* (2009.01)

(52) U.S. Cl. .................. 709/231; 709/204; 455/456.3; 715/753

(58) Field of Classification Search ............ 709/206, 709/219, 204; 700/1; 718/100; 715/753; 455/456.3
See application file for complete search history.

(56) References Cited

U.S. PATENT DOCUMENTS

| | | | |
|---|---|---|---|
| 6,557,029 B2 * | 4/2003 | Szymansky | 709/206 |
| 6,698,021 B1 | 2/2004 | Amini | |
| 7,031,728 B2 * | 4/2006 | Beyer, Jr. | 455/456.3 |
| 7,103,834 B1 | 9/2006 | Humpleman | |
| 7,382,244 B1 | 6/2008 | Donovan | |

(Continued)

FOREIGN PATENT DOCUMENTS

EP     0 893 919 A2     1/1999

(Continued)

OTHER PUBLICATIONS

Gardner, W.D., "Cingular to Demo Streaming Video During Cell Phone Calls," *InformationWeek*, <URL: http://www.informationweek.com/news/showArticle.jhtml?articleID=196801494>, Jan. 2007, (1 Page) (accessed Apr. 16, 2007).

(Continued)

*Primary Examiner*—Philip J Chea
(74) *Attorney, Agent, or Firm*—Baker Botts L.L.P.

(57) ABSTRACT

Methods and systems for remote data collection and distribution include components and operations for receiving, at a server, data transmitted by a first client device via a communication network. The method may also include selecting, by one or more client devices associated with the communication network, a second device to receive the data. The method may further include establishing a connection between the server and the selected second device via the communication network. The method may also include automatically transmitting the received data to the second device using the connection via the communication network. The method may further include causing, by the one or more client devices, the second device to execute a predefined operation.

40 Claims, 21 Drawing Sheets

U.S. PATENT DOCUMENTS

| | | | |
|---|---|---|---|
| 7,600,036 B2 * | 10/2009 | Hesselink et al. | 709/234 |
| 7,698,450 B2 | 4/2010 | Monroe | |
| 2002/0013809 A1 * | 1/2002 | Hashimoto et al. | 709/203 |
| 2002/0021352 A1 * | 2/2002 | Sato | 348/14.02 |
| 2004/0103184 A1 | 5/2004 | Humpleman et al. | |
| 2005/0080915 A1 | 4/2005 | Shoemaker et al. | |
| 2006/0002469 A1 | 1/2006 | Zurov et al. | |
| 2006/0002613 A1 | 1/2006 | Zurov et al. | |
| 2006/0074771 A1 | 4/2006 | Kim et al. | |
| 2006/0121441 A1 | 6/2006 | Spira | |
| 2006/0170693 A1 | 8/2006 | Bethune | |
| 2007/0044021 A1 | 2/2007 | Kim et al. | |
| 2007/0139182 A1 | 6/2007 | O'Connor | |
| 2007/0206091 A1 | 9/2007 | Dunn et al. | |
| 2009/0315972 A1 | 12/2009 | Rensin | |
| 2009/0319904 A1 | 12/2009 | Rensin | |
| 2009/0325570 A1 | 12/2009 | Rensin | |

FOREIGN PATENT DOCUMENTS

| | | |
|---|---|---|
| EP | 1 443 705 A1 | 8/2004 |
| EP | 1 453 247 A2 | 9/2004 |

OTHER PUBLICATIONS

"Highest Quality Live Video for Lowest Bandwidth Applications," <URL: http://www.cometvt.com/aboutus.aspx>, Comet Video Technologies, (4 pages) (accessed Apr. 16, 2007).

International Search Report dated Apr. 28, 2008, for Int'l Application No. PCT/US2007/000997 and written opinion (18 pages).

The Supplemental International Search Report in corresponding International Application No. PCT/US2007/000997, mailed by the International Searching Authority (US) on Sep. 11, 2008.

Office Action for U.S. Appl. No. 12/489,385 filed Apr. 22, 2010.

Office Action for U.S. Appl. No. 12/489,390 filed Jun. 8, 2010.

Office Action for U.S. Appl. No. 12/489,390 filed Dec. 9, 2009.

Office Action for U.S. Appl. No. 12/489,385 filed Oct. 14, 2010.

* cited by examiner

SYSTEM AND METHOD FOR REMOTE DATA ACQUISITION AND DISTRIBUTION

This application claims priority to and the benefit of the filing date of U.S. Provisional Patent Application No. 60/758,983, filed Jan. 17, 2006, which is herein incorporated by reference in its entirety.

FIELD OF THE INVENTION

This application relates generally to data collection systems and, more particularly to a system and method for remote data acquisition and distribution using fixed or mobile computing platforms.

INTRODUCTION

There are various technologies available in the marketplace for an organization to communicate in real-time with its personnel deployed in the field.

At the most basic level, the organization can maintain direct verbal communication using one or more kinds of mobile communication devices, such as cellular phones, two-way radios or other handheld devices. With the necessary wireless data connection, some of those devices can also transmit and receive various data through instant messaging, text messaging, mobile email, multimedia messaging and comparable service offerings. Using multimedia messaging, for instance, the organization and its deployed personnel can share messages with each other that include previously stored data files, such as text, photos, animated graphics, voice messages, and pre-recorded video clips.

The ability to communicate effectively becomes more challenging as the situation in the field becomes more fluid. An incident may have occurred, be in the process of occurring or be at risk of occurring. The more urgent and/or geographically dispersed the incident, the harder it can be for the organization to remotely monitor the situation and provide effective guidance to deployed personnel. Hurricane Katrina provides but one recent example of the communication challenges that can arise. At least in the initial stages of an incident, an organization may be relying on two-way verbal communications with fast-moving personnel on the ground. If the organization wants live visual imagery to help monitor and analyze the situation, it has several potential means to obtain it.

The organization can seek any available satellite imagery or aerial photography of the incident location. These technologies can produce high-resolution images which are increasingly available from public and private sources. For example, the National Oceanic and Atmospheric Administration made available on its Website images of the Gulf coast following Hurricane Katrina (http://ngs.woc.noaa.gov/katrina/). From the organization's perspective, the problem with these technologies is the lag that occurs from the time an incident has first occurred, to the time the satellite or aerial vehicle is physically in a position to capture the imagery (if at all), to the time it takes to process the captured imagery and make it available for viewing. This time lag can be measured in hours, days or longer, depending on various factors.

If the organization has its own video surveillance network in place in the area of interest, it can check whether any of its networked cameras are capturing the requisite imagery. That technology has been evolving over the years. The traditional closed-circuit TV setup involves analog cameras mounted at fixed positions and connected to a central command center via a dedicated cable connection. The cameras capture and transmit complete image frames, which are viewed on a television monitor and archived using a video recording device. If a particular camera has pan-tilt-zoom (PTZ) controls, the command center may also be able to remotely access those controls for enhanced viewing angles.

A recent trend has been the creation of IP-based surveillance networks of fixed cameras connected via wired and/or wireless networks. Such fixed IP cameras capture raw image frames that are compressed prior to transmission using a commercially available compression standard. (Equipment on the network can also convert analog camera frames to digital ones using various commercially available technologies.) Two of the most common compression standards are the Motion JPEG (or M-JPEG) standard and the MPEG standard.

The motion JPEG standard, or Motion Joint Photographic Experts Group standard, compresses each raw image on an intraframe or frame-by-frame basis. The MPEG standard, or Moving Pictures Expert Group standard, compresses the raw images on an intra-frame and inter-frame basis. Once compressed, the imagery is capable of being viewed, analyzed and stored in multiple ways. By way of example, the imagery can be viewed on computer monitors, certain mobile devices, and other equipment, and can be archived on digital video recorders, personal computers, and other mass storage solutions.

An IP-based network can provide other benefits as well. Many fixed IP cameras (and converted analog cameras) have a Web server application embedded in them. Each Web server has a unique URL, or Uniform Resource Locator, which may allow a fixed camera's live image stream to be viewed remotely through any Web browser or other Web-enabled application. The Web browser communicates directly with the fixed camera's dedicated Web server using a common Web protocol such as HTTP (Hypertext Transfer Protocol) or RTP (Real Time Protocol). Various vendors make available software applications that allow a mobile communication device to remotely view a fixed camera's live image stream through the embedded Web browser on the mobile device. Some of those applications also allow the mobile communication device to remotely control a fixed camera's available PTZ movements.

Further, a fixed camera's geospatial coordinates, if available, can be mapped to a Geographic Information System (GIS) or other viewing application for enhanced visualization by an organization. The Google Earth™ viewing application is one increasingly popular example of this type of service offering. Depending on each service offering's particular format, a camera's physical location can be depicted as an icon on a map, and the camera's URL can be shown as a hyperlink. By clicking on the hyperlink, the camera's live image stream can be viewed on the screen using a Web browser connected to the camera's server.

One problem with any analog or IP-based surveillance network is the inherent geographical limits of its fixed network cameras. A video camera has a limited viewing area/range. If an incident is occurring 50 miles from the nearest fixed camera, the organization and its mobile personnel will not be able to view the event. If an organization has the available resources, it can seek to put in place near the incident a temporary surveillance network using cameras that transmit over a wireless network. This type of network is often set up using a Wi-Fi® wireless local area network or in some cases using an available commercial cellular network or a satellite connection.

Even if an organization deploys a temporary mobile network, there are inherent limitations. There will inevitably be an initial time delay in setting up the network, and the network will still not be effective beyond the range of its cameras. There will also be an additional lag each time the network is redeployed to a new location in an effort to keep up with a geographically dispersed incident.

An organization can also seek to obtain visual images and other data from its deployed personnel or other sources near the incident. There are various data distribution technologies available to do so.

There are commercially available videophones and other video conferencing technologies that allow for simultaneous, peer-to-peer video and audio data transmissions, but only among connected users operating compatible viewing hardware.

A person with a digital camera, camcorder, webcam or comparable device can capture live images, transmit them via a wired (or in some cases wireless) connection to a personal computer or a laptop and save them as data files. Those data files can then be transferred through an email-type transfer via a wired or wireless connection. If the person has a media server installed on the personal computer or laptop, the data files can be made available for remote viewing on the media server. Alternatively, the data files can be transferred to a central server that is accessible via a communication network, such as the Internet. That stored data is then available for remote downloading by other registered users using a compatible video player.

If the person has a mobile communication device with an embedded camera, such as a camera-equipped cell phone, that person may be able to capture a still image or a short video clip on the device, save it as a data file and transfer it through an email-type transfer via a wired or wireless connection to one or more cellular numbers or email addresses. The individual can also transmit an accompanying text message or voice recording. Alternatively, there are applications available that allow the mobile communication device to stream live video and/or audio data directly to a central server for remote viewing as well.

In some cases, the ability to "webcast", "podcast" or use similar technologies allows certain data files to be made available for remote viewing by other users or automatically delivered to another user's computer at prescribed intervals or based on the occurrence of some event.

The preceding data distribution technologies may also allow certain captured data files to be tagged with their corresponding geospatial coordinates for subsequent viewing on a GIS service. Through various available means, the coordinates can be added to a digital image's exchangeable image file format (EXIF)—an industry standard—allowing the image to be displayed as an overlap on a digital map. Some services allow a digital image of any age to be manually dragged to its originating location on a digital map to create the linkage. Google's Picasa™ photo organizer, for instance, offers a tagging service in conjunction with Google Earth. The tagging can occur through multiple other means as well. The tagging can occur on the device itself, for example, if the device has the necessary Global Positioning System (GPS) chipset or if the device may be communicatively coupled to a separate GPS receiver. The tagging can also be accomplished through the use of digital mapping software applications and other means in which the timestamp of a digital image is matched to the timestamp of the geospatial coordinates captured by the separate GPS receiver.

One disadvantage with data distribution technologies, such as those described above, is that the data flows can be relatively slow and inefficient, particularly during an emergency. With e-mail-type transfers, it can take time to set up the e-mail message, add one or more addressees, add the attachments, and type any accompanying text. With a media server, a remote viewer must know the IP address of the media server, must know the file is available for viewing, and must have access to a compatible media player to view it. Further, the connection might not even be available if the media server is running on hardware that is using a wireless data connection due to the manner in which the commercial cellular networks assign changing IP addresses.

Uploading or streaming data files directly to a central server allows for simultaneous viewing by any number of associated users, but that, by itself, is not conducive to real-time interaction among the organization and its dispersed personnel. The data flow is still passive, as data files are typically deposited in a single location for remote viewing by associated users, who may be required to search, identify, download, and execute applications for displaying or processing the data files. For example, if employee A is streaming live video directly to the server, employees B and C may be required to affirmatively establish independent connections to that server to view the live feed (or the archived feed if employee A has ceased transmitting video at the point employees B and C establish their server connection).

One potential challenge arises when Employee A is streaming live video and wants one or more devices in a heterogeneous network with entirely separately geographical locations (some with fixed computing platforms and some with handhelds and other mobile computing devices) to immediately and automatically display the same live video stream. Another challenge may arise when employee A is watching a live feed from another source (such as a fixed camera) and wants one or more devices to display the live feed. In another example, employee B may be watching a live feed being sent simultaneously (i.e., in real-time) by employee A, and employee B wants to cause the devices associated with employees C and D to display that same live feed as well, without requiring action by employees C and D. In yet another example, an organization (or associated user of an organization's network) may create a new data file or obtain an existing data file—such as a still photo, a map or other data file—and may wish to share the file immediately with other users, without requiring any prior notification to them or any independent action by them. Thus, a dynamic command and control communication system may be required that allows an organization and its employees to acquire and distribute live video, audio, and data streams in real-time and provide a platform for causing one or more devices on the organization's network to automatically display, stream, or process the data, without specific interaction from a user of the device.

Thus, a need exists for a mobile command and control system that can overcome the problems associated with the real time capture and distribution of data files using fixed or mobile computing platforms.

SUMMARY OF THE INVENTION

In accordance with one aspect, the present disclosure is directed toward a method for the remote acquisition and distribution of data files using any fixed or mobile computing platform. The method may include receiving, at a server, live streaming video, audio and/or other data being transmitted by a first client device via a communication network, which may be a wired network, wireless network, or some combination thereof. The streaming data may originate with the first client device using the device's built-in video and/or audio capture functionality, or from another source that is communicatively coupled to the first data collective device, such as separate camera or other applicable data collection source. A second client device may be selected by the first client device to receive the streaming data and a connection between the server and the selected second client device may be established via a communication network. The received streaming data may then be automatically transmitted to the second client device using the connection via the communication network. The method may also include causing the second device to display the streaming data while the first client device continues to transmit that data.

According to another aspect, the present disclosure is directed toward a system for collecting and distributing real-time streaming video. The system may include a first client device comprising one or more of a camera for collecting video images, a microphone for collecting audio data, an internal or external GPS receiver for collecting location data, a processor for transforming those video images and audio data into streaming data, and a transmitter for transmitting the streaming data via a communication network. The system may also include a first client device that is communicatively coupled to a separate camera or other applicable data collection source. The system may also include a second client device comprising a receiver for receiving data via the wired and/or wireless network and a screen for displaying the received data. The system may also include a server configured to receive the streaming data transmitted by the first client device via the wired and/or wireless network, select the second client device from among a plurality of client devices, establish a connection with the second client device via the wired and/or wireless network, automatically transmit the received streaming data to the second device using the connection via the wired and/or wireless network, and cause the second device to display the streaming data while the first mobile device transmits the data.

According to another aspect, the present disclosure is directed toward a method for the remote acquisition and distribution of data files that may include allowing a third client device to independently search for, select and display the streaming data from the first client device while the first client device continues to transmit that data, and allowing the third client device to independently select a fourth client device from among a plurality of client devices to receive the streaming data. A connection between the server and the selected fourth client device may be established via a communication network. The received streaming data may then be automatically transmitted to the fourth client device using the connection via the wired and/or wireless network. The method may also include causing the fourth client device to display the streaming data while the first client device continues to transmit that data.

According to another aspect, the present disclosure is directed toward a method for the remote acquisition and distribution of data files that may include allowing a first client device to remotely access any relevant data source available at the central server or any associated servers (such as the archived video streams previously transmitted by a client device) or to upload a data file for delivery to the central server or any associated server, in each case via a communication network. The uploaded data file may originate from numerous sources, such as the first client device itself, or from another data collection source that is communicatively coupled to the first data collective device, or from an uncoupled source, such as a separate digital photo or other data file stored on a compact flash, SD card or other suitable media. The method may also include allowing the first client device to independently select a second client device from among a plurality of client devices to receive any relevant data source available at the central server or any associated servers or to receive any data file uploaded by the first client device. A connection between the server and the second client device may be established via a communication network. The data file selected by the first client device may then be automatically transmitted to the second client device using the connection via the wired and/or wireless network. The method may also include causing the second client device to display or otherwise process the selected data file. The method may also include allowing the second client device to independently select a third client device from among a plurality of client devices to receive the same selected data file or any other available data file.

According to another aspect, the present disclosure is directed toward a system for the remote collection and distribution of real-time streaming video from a fixed or mobile video camera. The system may include allowing a first client device to select, through the central server, a specific video camera for remote viewing and to establish a connection to that camera via a communication network. The system may include allowing the first client device to display the live video stream from the selected camera. The system may also include allowing the first client device to independently select a second client device from among a plurality of client devices to display the same live feed from the selected camera, and a connection may be established between the second client device and the selected camera via a communication network. The live video stream from the selected camera may then be automatically transmitted to the second client device using the connection via the wired and/or wireless network. The method may also include allowing the second client device to display the streaming data whether or not the first client device continues to maintain its own connection to the selected camera. The method may also include allowing the second client device to independently select a third client device from among a plurality of client devices to display the same or different steaming video.

According to another aspect, the present disclosure is directed toward a method for the remote acquisition and distribution of data files that may include allowing any client device to exercise the various other command and control functionality described below in order to permit the remote acquisition and distribution of data files in real-time.

According to another aspect, the present disclosure is directed toward a command and control system that incorporates a user interface that allows a user of the client device to establish when the client device will be available for data transfer (i.e., when the device will be accessible and/or controllable by one or more other devices on the network). Alternatively and/or additionally, the user interface may allow a client device to periodically and/or continuously "check-in" with other systems of the communication network. During "check-in", the client device may receive any data files and/or any requests for data that were provided to the device during periods where the device was unavailable. By providing an interface that allows the device to "check-in" to the network, the presently disclosed system may provide a means for organizations to maintain contact with the client device (during, for example, an emergency) although the device may be periodically unavailable or inaccessible to the server.

According to another aspect, the present disclosure is directed toward a mobile command and control system that enables one or more client or command center devices to track position and/or location associated with one or more client device and/or other incoming data sources.

According to another aspect, the present disclosure is directed toward a mobile command and control system that may readily interface with one or more data collection devices, such as microphones, audio recorders, flash drives, digital cameras, sensors or any other suitable data collection device. The mobile command and control system may collect information, either actively or passively, and in a variety of communication formats, such as wireless communications (e.g., Bluetooth, WLAN, etc.), hard-docking (e.g., flash drives, discs, DVD-ROM, etc.), or wire-based communications (e.g., USB, fire-wire, Ethernet, etc.).

According to another aspect, the present disclosure is directed toward a mobile command and control system that has been specifically designed to allow for the integration of additional third-party components and systems.

BRIEF DESCRIPTION OF THE DRAWINGS

The novel features and advantages of embodiments consistent with the present disclosure will best be understood by reference to the detailed description of the embodiments which follows, when read in conjunction with the accompanying drawings, in which.

DETAILED DESCRIPTION

Figure 1:
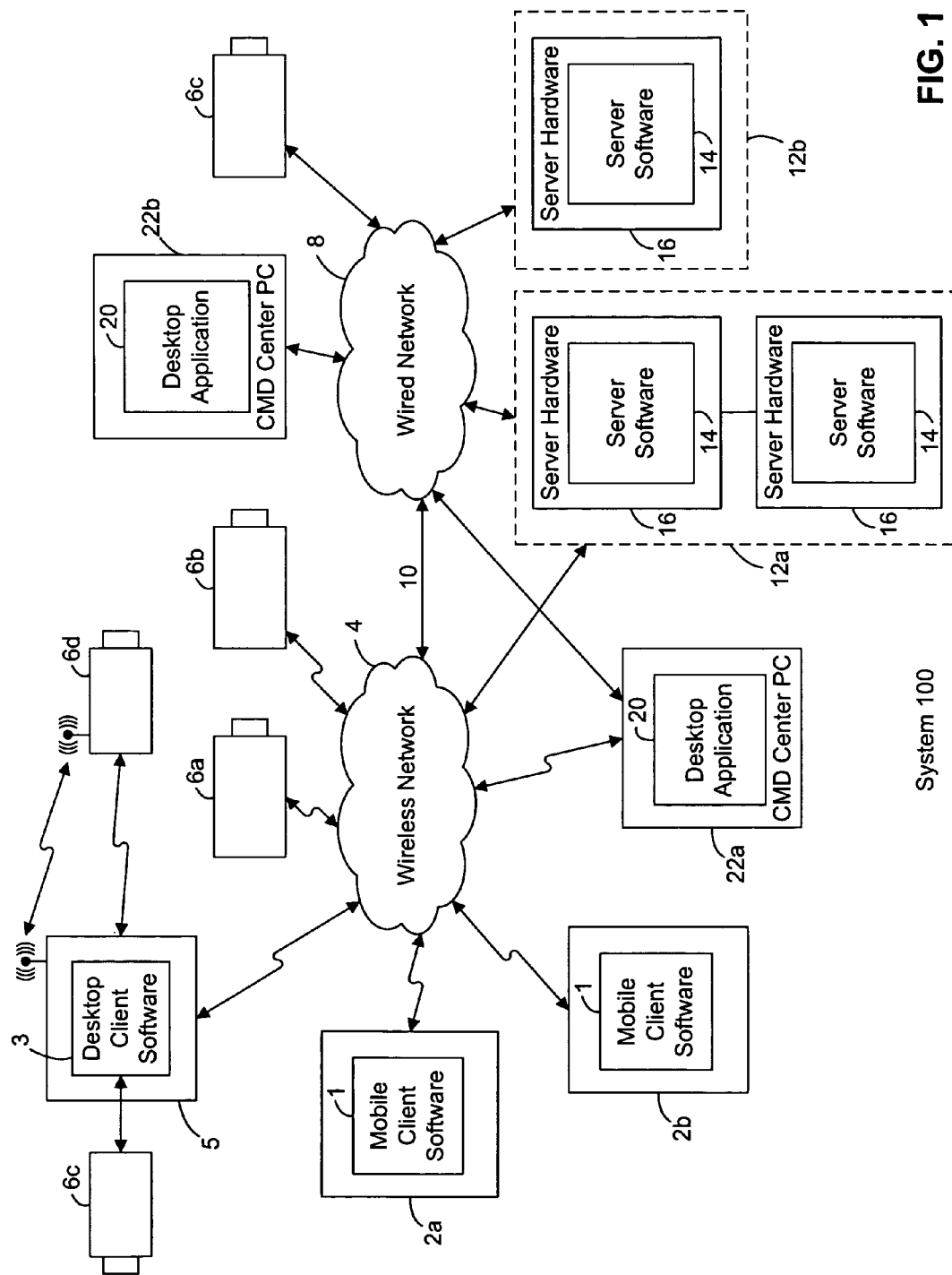
FIG. 1 is a block diagram of the mobile command and control system according to an exemplary disclosed embodiment.

Various features of the exemplary embodiments will now be described with reference to the drawing figures, in which like parts are identified with the same reference characters where convenient. The following description of embodiments consistent with the invention is not to be taken in a limiting sense, but is provided merely for the purpose of describing the general principles of the invention.

Overview

Embodiments of systems and methods consistent with the present disclosure relate to a mobile command and control system that may comprise mobile client software that may be installed on one or more customized and/or commercially available handheld devices or other mobile communication devices. The mobile client software may allow users to collect and transmit live video streams, live audio streams, still images, location data, etc., to a central server via a communication network. The software may allow certain devices designated by a network administrator to remotely access and command one or more client devices, thereby allowing the designated devices to remotely control certain operational aspects associated with the client devices. For example, according to one embodiment, one or more client devices may be designated to, among other things, cause one or more other devices to display a particular video stream or image file. Alternatively and/or additionally, one or more client devices may be designated to activate a camera, microphone, location sensing technology, data sensor, or other input device to begin collecting data and streaming the collected data to one or more client devices and/or a central server.

Embodiments of a mobile command and control system consistent with the invention may further comprise desktop client software that may be installed on one or more personal computers, laptops and other fixed or mobile computing platforms and that functions substantially in the same manner as the mobile client software, allowing for variations in the underlying functionality of the computing platform on which the desktop client software is installed. For example, unlike many mobile communication devices, the desktop client hardware may not have a built-in video camera, but may nonetheless be communicatively coupled to an external video camera to allow for the transfer of streaming video to the central server. Both the mobile client software and the desktop client software may be communicatively coupled to one or more data collection devices, such as GPS receivers, audio recorders, sensors or any other suitable data collection device.

Embodiments of a mobile command and control system consistent with the invention may further comprise server software that may be installed on server hardware and that receives and processes the incoming and outgoing data traffic to, from and among the mobile client devices and the desktop client devices, among other things. The server software and the server hardware on which it is installed may be referred to generally as a command center server. As described further below, an organization can maintain one or more command center servers depending on its specific requirements, each of which may serve a different function in the system.

Embodiments of a mobile command and control system consistent with the present disclosure may further comprise a desktop application that runs on one or more personal computers, laptops and other fixed or mobile computing platforms and that allows its operator to exercise command and control functionality, including the ability to access the data maintained on the command center servers, to view incoming and stored data files in multiple viewing formats, and to transmit messages, commands and other data files to mobile client devices and desktop client devices, near or in real-time, among other things.

I. System Architecture

A. Network

FIG. 1 is a block diagram of an exemplary disclosed mobile command and control system (system) 100 consistent with one or more disclosed embodiments. In the embodiment shown, the system 100 may comprise mobile client software 1 that runs on a plurality of mobile communication devices (mobile client devices) 2a, 2b. The mobile client devices 2a, 2b communicate with other components of the system 100 via a wireless network 4. The wireless network can be any type of wireless network, or can be a combination of more than one wireless network. For example, the system 100 can work with any current commercial cellular network (including GSM/GPRS and CDMA/1xRTT) and any faster next-generation data services that might be available such as 3G services (including EDGE, UMTS, HSDPA, EVDO and WCDMA). Other types of wireless networks 4 that can be used in the system 100 according to an exemplary disclosed embodiment may include any wireless local area network (such as a Wi-Fi® network), and any private cellular network, such as a picocell-type base station configuration. A private cellular network can be especially useful in circumstances when the commercial cellular networks are temporarily unavailable, as can occur, for example, in an emergency situation. Still further, the wireless network 4 could be a satellite based wireless system.

In the embodiment shown, the system 100 may further comprise desktop client software 3 that runs on a plurality of desktop personal computers, laptops and other fixed or mobile computer platforms (desktop client devices) 5a, 5b. Desktop client device 5 may communicate with other components of the system 100 via a wireless network 4 or a wired network 8 or a combination of the two. The desktop client software 3 functions in substantially the same manner as the mobile client software 1, allowing for variations in the underlying functionality of the computing platform on which the desktop client software is installed. For ease of reference, and unless the context specifically requires otherwise below, the mobile client software 1 and the desktop client software 3 are referred to collectively as the client software and the mobile client devices 2 and the desktop client devices 5 are referred to collectively as the client devices.

In the embodiment shown, the system 100 may further comprise any or all of an organization's fixed and/or mobile networked cameras 6a, 6b, 6c and 6d and other available fixed or mobile cameras through the networks 4, 8 (e.g., fixed cameras 6) that the organization wishes to incorporate into the system 100. A fixed camera 6 may communicate via the wireless network 4, or can be connected to a wired network 8. The wireless network 4 is connected via a communication path 10 to the wired network 8. The wired network 8 can, and often will, comprise a plurality of wired networks that interface to provide access to/from the client devices. For example, a first wired network 8 can be the Internet, which is then connected to a local area network and/or wide area network, or an organization's other type of wired network. Collectively, these are referred to as the wired network 8. Similarly, wireless network 4 may comprise a plurality of wireless networks, such as interconnected wireless networks of various wireless service providers (e.g., Verizon Wireless, Sprint, Cingular, TMobile etc.).

The system 100 may further comprise one or more command center servers 12a, 12b. Each command center server 12 may be comprised of one or more types of server software 14 that is installed on one or more types of server hardware 16. The command center servers 12a, 12b may transmit data to, and receive data from, any client device via wireless network 4 (for example, where the server hardware 16 comprises a laptop or other mobile computing platform that is capable of connecting with wireless network 4 or via wired network 8 or a combination of the two. As described further below, an organization can maintain one or more command center servers 12 depending on its specific requirements, each of which may serve a different function in the system 100.

For example, as described further below, the system 100 may include:

One or more core command center servers 12 communicatively coupled with each other and serving as the primary hub for the acquisition and distribution of data files within the system 100.

One or more intervening command center servers 12 that act as a data gateway in the system 100 to translate between different data transport mediums. For example, if employee A has an email attachment that he or she wishes to circulate immediately within the system 100, the email may be sent directly to the data gateway address, and the email attachment may be translated into a format suitable for redistribution to one or more client devices through the messaging and routing function described further below.

One or more intervening command center servers 12 that act as a proxy server in the system 100 for, among other things, facilitating multiple simultaneous requests by client devices to access one or more fixed cameras 6 that may otherwise be limited in the number of direct simultaneous connections they will support.

As shown, the system 100 may further comprise a desktop application 20 that is installed on one or more personal computers, laptops, or other fixed or mobile computing platforms (command center PCs) 22a, 22b. Command center PC 22 communicates with command center server 12 and can be connected via wired network 8 or wireless network 4 or a combination of the two. Any person who operates command center PC 22 is referred to generally as a command center operator. In another embodiment, the functions of a command center PC 22 and a command center server 12 may be combined in a single computer system. For example, a single computing platform may have installed on it both server software 14 and the desktop application 20. In another embodiment, a variation of the desktop application 20 may be installed separately on a mobile client device 2 or a desktop client device 5.

B. Mobile Client Devices

Figure 2A:
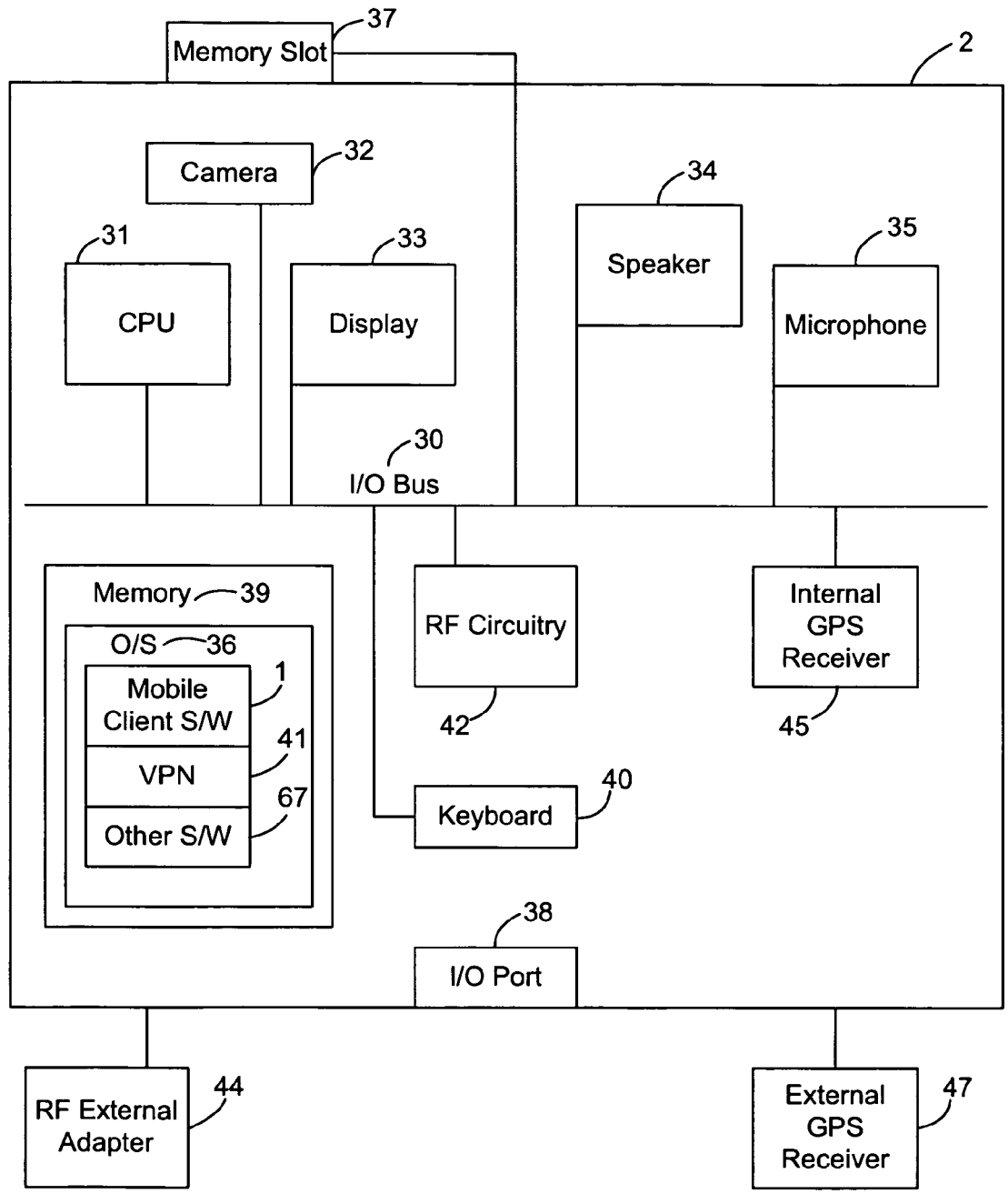
FIGS. 2A-2B are schematic block diagrams of an exemplary mobile client device that may be used in the system shown in FIG. 1.

FIG. 2A is a schematic block diagram of an exemplary mobile client device 2 that may be used in the system shown in FIG. 1. The mobile client device 2 can be any mobile device—such as, for example, a Palm™ Treo® smartphone or a Windows®-based Pocket PC or Smartphone device—that is capable of capturing and transmitting video image data and connecting to a wireless network 4. The mobile client device 2 may comprise an input/output bus 30, a central processing unit (CPU) 31, a camera 32, a display screen 33, a speaker 34, a microphone 35, an operating system 36, a memory slot 37, an input/output port 38, memory 39, and/or a user-input interface (keyboard) 40. Mobile client device 2 may include additional, fewer, and/or different components than those listed above.

The mobile client device 2 shown further comprises radio frequency (RF) transmitting/receiving circuitry for wireless communication, such as RF circuitry 42. As one of ordinary skill in the art can appreciate, various types of RF technologies may be used, and mobile client device 2 may include separate RF circuitry 42 to support one or more of them. For example, mobile client device 2 may comprise RF circuitry 42 to support a cellular wireless standard and RF circuitry 42 to support the Bluetooth® short-range wireless connectivity standard, the details of which are known in the art and omitted in the interest of brevity.

In addition, mobile client device 2 may be capable of supporting additional RF technologies through a communicative coupling with other hardware that has RF circuitry embedded in it, such as RF external adapter 44. For example, there are commercially available RF external adapters 44 available to support the Wi-Fi® wireless standard. This type of RF external adapter 44 may attach to the mobile client device 2 in different ways, such as through memory slot 37 or input/output port 38 or through a Bluetooth® wireless connection if both the mobile device 2 and the RF external adapter 44 support that standard.

As shown, mobile client device 2 can have an internal GPS receiver 45 or may be communicatively coupled to an external GPS receiver 47, such as through the memory slot 37, the input/output port 38, or through a Bluetooth® wireless connection if both the mobile device 2 and the external GPS receiver 47 support that standard. In either case, the GPS receiver may be used to triangulate longitude, latitude, and other location data by receiving radio wave signals from GPS satellites. Alternatively, a location may be determined by a cellular signal broadcast from the mobile device to triangulate the position of the mobile client device using available cellular emergency location technology (e.g., federal E911 program, etc.). The use of location data is discussed in greater detail below.

Figure 2B:
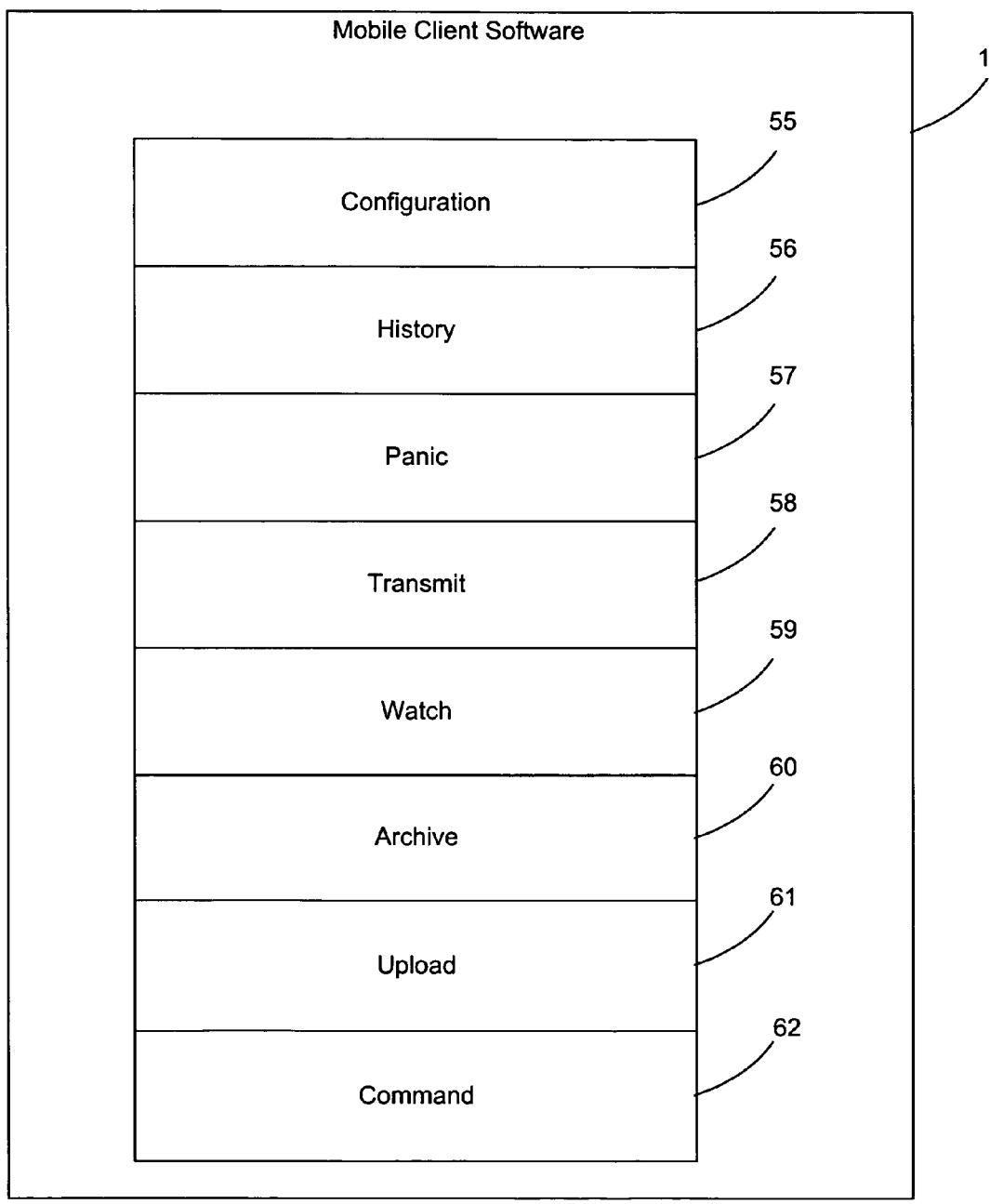

As shown, mobile client device 2 memory 39 may contain the device's operating system 36, which interacts with mobile client software 1. The mobile client software 1 may comprise any number of components depending on the nature of the data being transmitted within the system 100. For example, the mobile client software 1 may comprise eight separate major functions, each of which is shown on the exemplary schematic block diagram of the mobile client software 1 appearing on FIG. 2B and each of which may have any number of subfunctions associated with it. As shown in FIG. 2B:

A configuration function 55 may allow a user to configure the mobile client device 2, or allow the command center server 12 to cause the mobile client device 1 to be configured, in different ways for the purpose of communicating data within the system 100.

A history function 56 may allow a user to repeat on the mobile client device 2 prior instances in which the mobile client device 2 received a message, command or other data from a command center PC 22 or another client device.

A panic function 57 may allow a user to initiate a panic sequence on the mobile client device 2 and send an immediate alert (silent or audible) to the command center server 12 for immediate assistance.

A transmit function 58 may allow a user to capture and transmit live imagery from the mobile client device 2 to a command center server 12 using various video compression technologies. As described further below, in one embodiment, the live imagery may be compressed and transmitted on a frame-by-frame basis using a JPEG format that has been integrated into the transmit function 58. In another embodiment, live audio may be transmitted with, or instead of, the imagery. In yet another embodiment, location information and other applicable data, such as sensor data (e.g. temperature, radiation levels, etc.) may also be transmitted, with or without live video and/or audio data.

A watch function 59 may allow a user to remotely search for and view live imagery being streamed by a fixed camera 6, by another mobile client device 2, by a desktop client device 5 or by other available sources.

An archive function 60 may allow a user to remotely search for and view archived imagery previously captured by the system 100.

An upload function 61 may allow the user to upload data files from the mobile client device 2 for storage at the command center server 12 and for immediate or subsequent distribution within and outside the system 100. The uploaded data file may originate from numerous sources, such as the mobile client device 2 itself, or from another data collection source that is communicatively coupled to the mobile client device 2, or from an uncoupled source, such as a separate digital photo or other data file stored on a compact flash, SD card or other suitable media.

A command function 62 may allow the user to exercise various command and control functionality from the mobile client device 2 to cause data files to be created and communicated within the system 100.

As shown on the preceding FIG. 2A, the mobile client device 2 operating system 36 may also contain a virtual private network (VPN) and/or other encryption technology 41 to encrypt the incoming and outgoing data traffic between the mobile client device 2 and an organization's data network. An organization may install on the mobile client device 2 its own preferred encryption technology, such as a commercially available Federal Information Processing Standard (FIPS) 140-2 compliant encryption technology.

It is contemplated that operating system 36 associated with mobile client device 2 may contain additional and/or different programs than those listed above, such as one or more software applications 67. It is further contemplated that components and/or software described in association with operating system 36 are exemplary only, and not intended to be limiting.

C. Desktop Client Devices

Figure 2C:
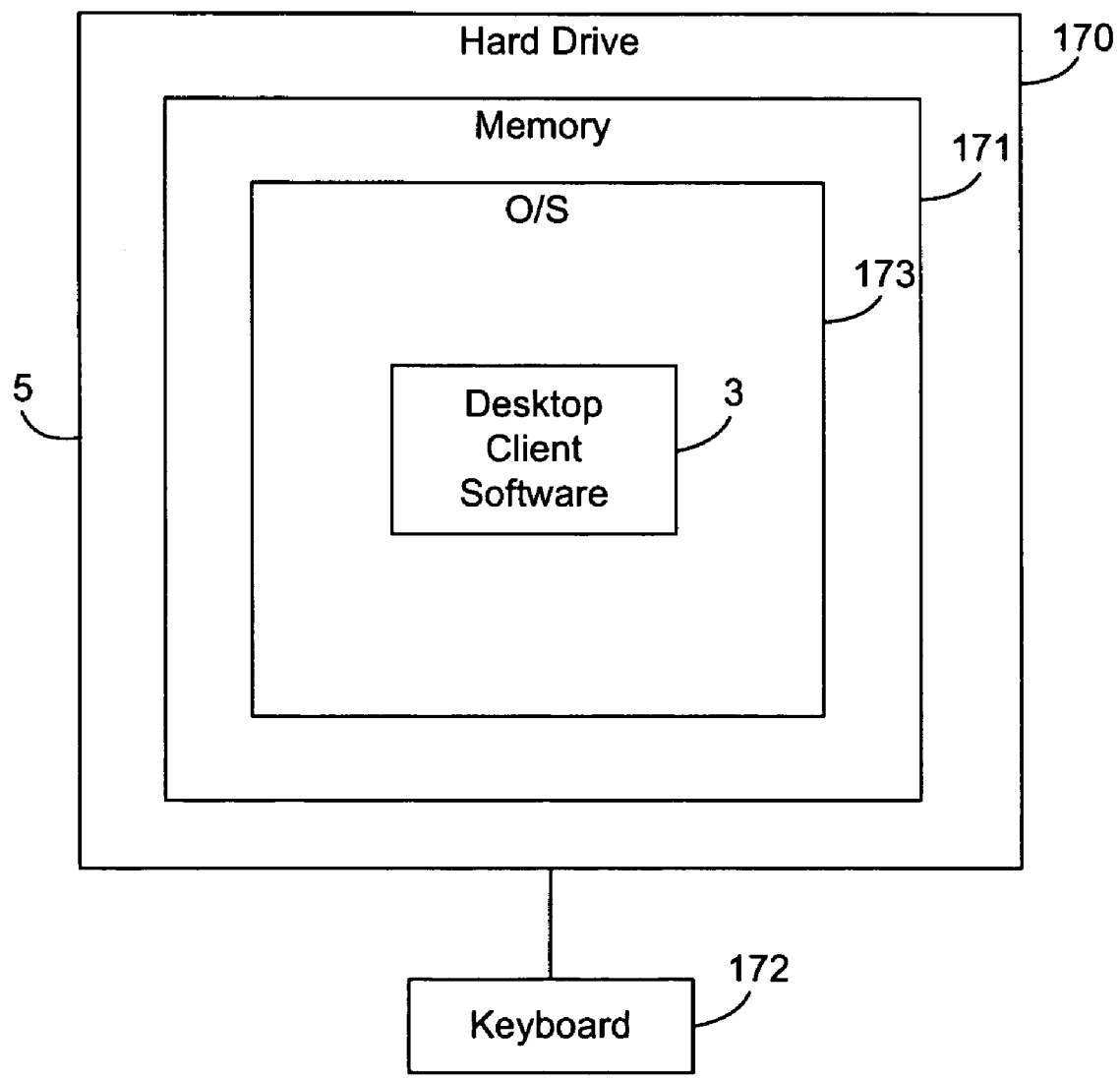
FIG. 2C is an schematic block diagrams of an exemplary desktop client device that may be used in the system shown in FIG. 1.

FIG. 2C is a schematic block diagram of an exemplary disclosed desktop client device 5 that is running the desktop client application 20 consistent with one exemplary embodiment. Command center PC 22 may include any desktop personal computer, laptop or other fixed or mobile computer platform that is capable of running an operating system 173, such as, for example, the Windows 2000® operating system or a later version. Each command center PC 22 may also include, among other components, a hard drive 170, memory 171 and a keyboard 172. Desktop client software 3 may run on the operating system 173. Desktop client device 5 may include additional, fewer, and/or different components than those listed above.

As noted earlier, the desktop client software 3 may function in substantially the same manner as the mobile client software 1. For example, as with a mobile client device 2, a desktop client device 5 can have an internal GPS receiver 45 or may be communicatively coupled to an external GPS receiver 47, such as through a USB serial connection or through a Bluetooth® wireless connection. Further, the desktop client device 5 may also comprise any number of components depending on the nature of the data being transmitted within the system 100, and may, at minimum, comprise the software applications previously shown on the exemplary schematic block diagram of the mobile client software 1 appearing on FIG. 2B.

As with a mobile client device 2, it is contemplated that operating system 173 associated with a desktop client device 5 may contain additional and/or different programs than those listed above, such as one or more software applications. It is further contemplated that components and/or software described in association with operating system 173 are exemplary only, and not intended to be limiting.

D. Command Center Server

Figure 3A:
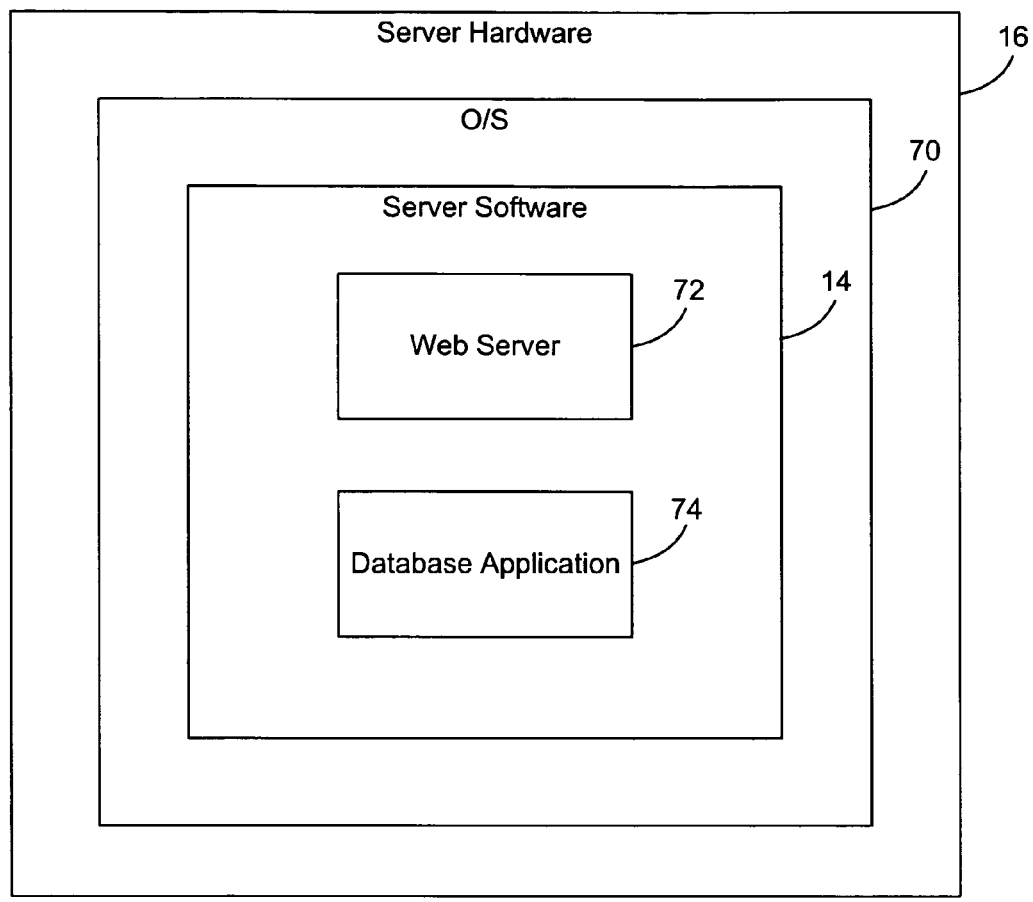
FIG. 3A-3C are schematic block diagrams of an exemplary command center server that may be used in the system shown in FIG. 1.

FIG. 3A is a schematic block diagram illustrating components that may be associated with command center server 12, according to an exemplary embodiment. Among other components, command center server 12 may include server hardware 16 on which runs a server operating system 70 and the server software 14. In one embodiment, the server hardware 16 can be any server hardware that supports an operating system, such as a Microsoft® operating system. According to one embodiment the server operating system 70 may include the Windows XP® operating system or other suitable operating system. The server software 14 may also include a Web server 72 and a database application 74, each of which is described further below. Command center server 12 may include additional, fewer, and/or different components than those listed above.

In one embodiment, the Web server 72 may include the Microsoft® Internet Information Services Web Server™ and the database application 74 may include the Microsoft® SQL Server. However, it is contemplated that additional and/or different applications may be included with server operating system 70, Web server 72 and/or database application 74, respectively. It is further contemplated that components and/or software described in association with operating system 70 are exemplary only, and not intended to be limiting.

1. The Server Software

Figure 3B:
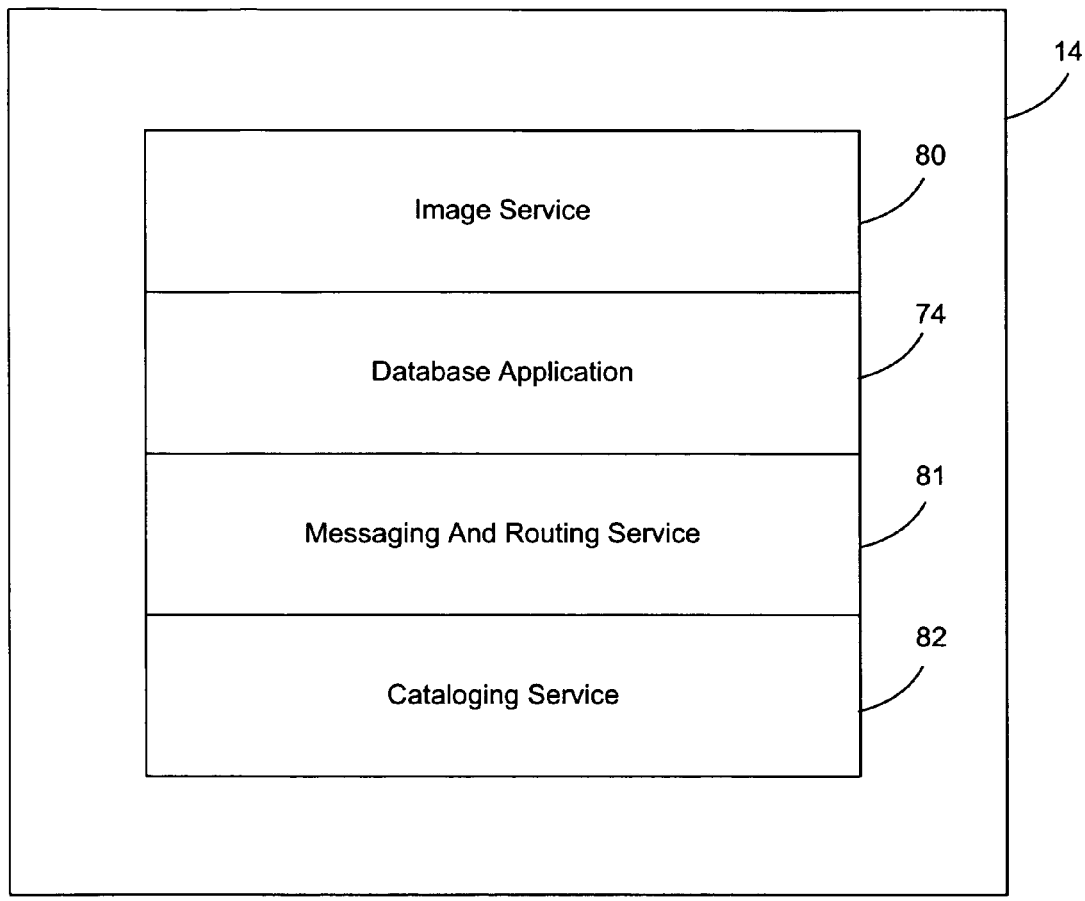

FIG. 3B is a schematic block diagram illustrating components that may be associated with server software 14, according to an exemplary embodiment:

An image service 80 may receive and process the live imagery (e.g., streaming video data) transmitted from a mobile client device 2, a desktop client device 5 or other sources.

Various databases may be included in a database application 74 for storing the processed imagery and other data files introduced into the system 100.

A messaging and routing service 81 may be managed by the Web server 72 to communicate messages, commands and other data to, from and among the client devices and other applicable sources.

A cataloging service 82 may be managed by the Web server 72 to maintain and communicate information about each fixed camera 6.

Figure 3C:
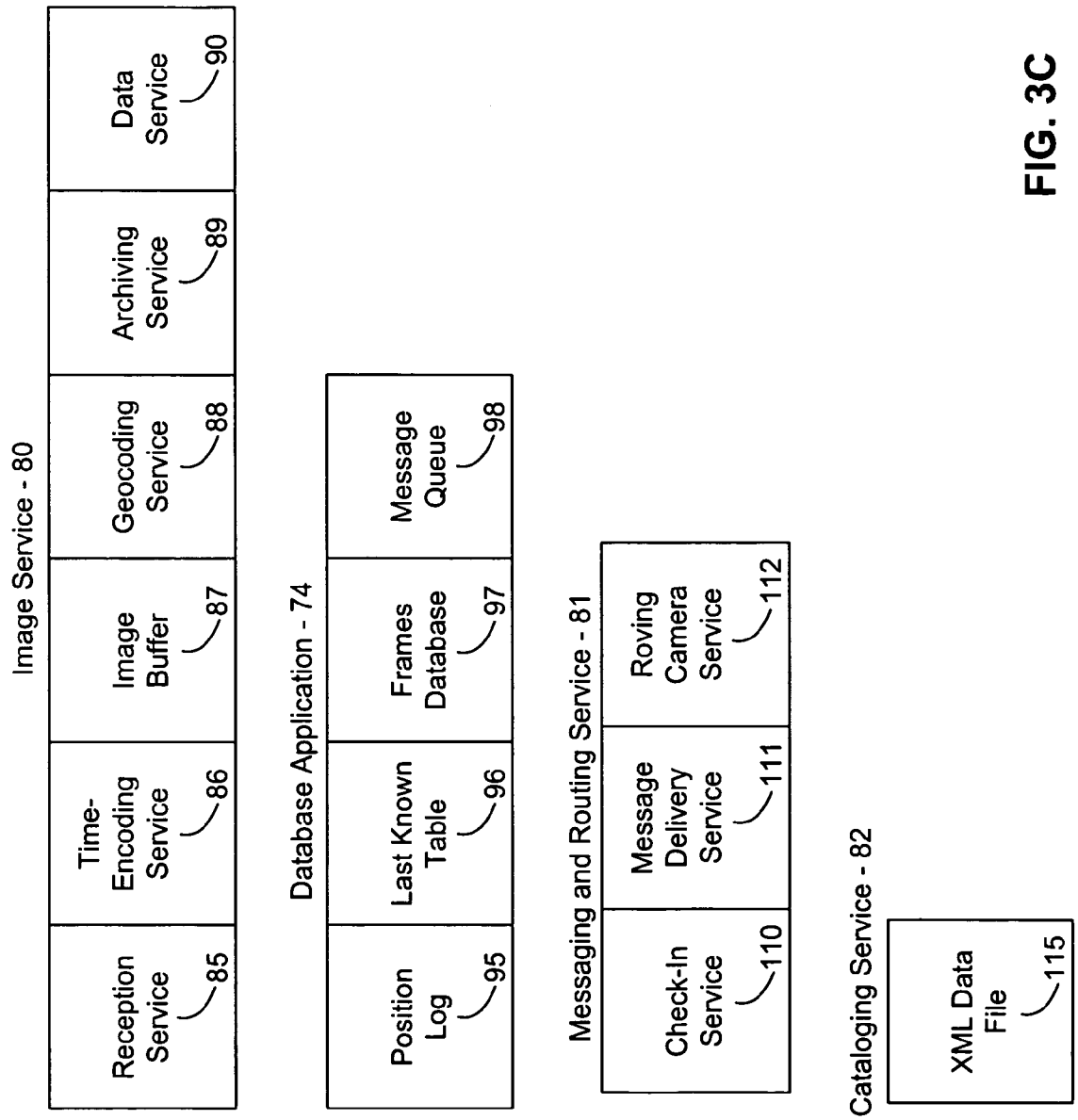

Each of these components may include one or more subcomponents, as illustrated by the schematic block diagram shown in the FIG. 3C. By way of overview, exemplary server software 14 primary components and subcomponents are described briefly below and in greater detail further below.

(a) The Image Service

As noted earlier, live imagery may be transmitted by a mobile client device 2, a desktop client device 5 or other sources (such as a fixed camera 6) to the command center server 12 in any compatible format, such as the JPEG format. In a preferred embodiment, a command center server 12 may also include the capability to transcode an incompatible format into a compatible format for incorporation within the system 100. According to one embodiment, imagery may be transmitted on a frame-by-frame basis, for example, as streaming video data. The image service 80 may receive and process each image frame. As shown in FIG. 3C, the image service 80 may include one or more subcomponents, such as a reception service 85, a time-encoding service 86, an image buffer 87, a geocoding service 88, an archiving service 89 and a data service 90.

(i) The Reception Service

An exemplary reception service 85 may receive each incoming image frame and transcode it into any image file format, such as the Exchangeable Image File Format (EXIF). Image format files including the applicable file format are well known to those of ordinary skill in the art, and are not described further in the interest of brevity. The reception service 85 may be configured to handle multiple simultaneous incoming connections.

(ii) The Time-Encoding Service

In one embodiment, each image frame may then be routed to the time-encoding service 86, which writes date and time information associated with each frame to the image file format.

(iii) The Image Buffer

Each image frame may then be routed to, and stored in, an exemplary image buffer 87. The image buffer 87 may be configured to store one or more image frames. As the image buffer 87 fills up, each image frame may be routed on a first-in, first-out basis to an exemplary geocoding service 88. The image buffering process is also well known to those of ordinary skill in the art, and is not described further in the interest of brevity.

Image frames stored in the image buffer 87 may be retrieved for live viewing by command center PC 22, by any mobile client device 2, by any desktop client device 5 or by other sources. These images may be transferred automatically, periodically, and/or in response to a request from the applicable viewing source. For example, the desktop application 20 (in the case of command center PC 22) or the watch function 59 (in the case of a client device) may retrieve image frames stored in the image buffer 87. In any case, the requested image frames may be formatted and transmitted by the image buffer 87 as an M-JPEG video stream or any other suitable format. In addition, the image frames may also be viewed by various other sources, such as by a third-party application capable of receiving a formatted video stream, or by a digital video recorder or network video recorder, or by a Web browser or third-party media player (such as the Windows® Media Player) capable of viewing formatted video streams. The image buffer 87 may be configured to handle multiple simultaneous outgoing connections.

(iv) The Geocoding Service

Once the geocoding service 88 receives the time-encoded image frame from the image buffer 87, it may retrieve from the last known table 96 in the database application 74 the last known location data for the applicable client device or other source that originated the image frame. As described in greater detail below, the available location data may have been received in different ways by the command center server 12 and may accordingly be processed by the geocoding service 88 in different ways.

In one embodiment, the geocoding service 88 may first determine whether the date and time of the image match the date and time of the available location data (or, alternatively, if the respective dates and times are within a designated time interval of each other), and, if so, the geocoding service 88 may reformat the image frame, incorporate that location data into the applicable image file format, and route the image frame to the frames database 97 in the database application 74 for archiving and subsequent retrieval. If, however, the available location data falls outside the designated time interval, the image frame may instead be routed to the frames database 97 without further action, thereby potentially reducing the risk that dated location data may inadvertently be incorporated into the wrong image frame.

Alternatively, the client device may have transmitted the image frames and the corresponding location data together to the command center server 12 (using different potential methods, as described further below), in which case the geocoding service 88 may route those images to the frames database 97 without further action.

(v) The Archiving Service

As shown in FIG. 3C, an exemplary archiving service 89 may process one or more requests to view archived image frames by retrieving them from the frames database 97 and reformatting them as an M-JPEG video stream or other suitable format. As with live video frames in the image buffer 87, the archived image frames may also be viewed by a command center PC 22, a client device or by various other sources, such as by a third-party application capable of receiving a formatted video stream, or by a digital video recorder or network video recorder, or by a Web browser or third-party media player (such as the Windows® Media Player) capable of viewing formatted video streams. The archiving service 89 may be configured to handle multiple simultaneous outgoing connections.

(vi) The Data Service

An exemplary data service 90 may process one or more requests to view archived image frames in their original format, together with any associated information contained in the frames database 97 for those archived image frames.

(b) The Database Application

Database application 74 may maintain any number of databases to store applicable data. For example, the types of databases that can be used in the system 100 may include:

An exemplary position log 95 may, for example, maintain a continuous history for each client device of each instance in which it reported its location data and of each instance in which the client device engaged the panic function 57, the transmit function 58, the watch function 59 or any other functionality available on the applicable mobile client software 1 or desktop client software 3.

An exemplary last known table 96 may include the most recent entry from the position log 95 for each client device.

An exemplary message queue 98 may temporarily store one or more messages, commands and other data communications from command center PC 22 to a client device or among client devices.

An exemplary frames database 97, as noted earlier, may receive image frames from the geocoding service 88 and archive them for subsequent retrieval.

According to one exemplary embodiment, the types of data that can be maintained in the frames database 97 of the database application 74, may include, for example:

An exemplary frame entry, which may store image frames on a frame-by frame or other basis.

An exemplary event time entry that may record the date and time established by the time-encoding service 86 for an image frame.

An exemplary device ID entry that may record a unique identification name, number or other indicator for the client device or other source that captured and transmitted the image frame, as described further below.

Exemplary location entries (i.e., latitude entry, longitude entry, altitude entry etc.) that may capture and maintain designated location information associated with the image frame.

An exemplary timestamp entry may record the date and time that the available location data was first delivered to the command center server 12.

One or more additional databases associated with database application 74 are discussed in further detail below.

(c) The Messaging and Routing Service

As shown on the preceding FIG. 3C, the messaging and routing service 81 may include one or more components, such as a check-in service 110, a message delivery service 111 and a roving camera service 112. According to an exemplary embodiment and as described further below, the check-in service 110 may exchange data with any one or more client devices at designated time intervals, the message delivery service 111 may receive messages, commands and other data from command center PC 22 or any other client device and then route them to the message queue 98 to await the next check-in service 110, and the roving camera service 112 may communicate information about the client devices when they stream live video and other data files to command center server 12.

Further, in one embodiment the messaging and routing service 81 may be implemented as a SOAP-based Web service. SOAP, or Simple Object Access Protocol, is well known to those of ordinary skill in the art, and is not described further in the interest of brevity.

(d) The Cataloging Service

As shown in FIG. 3C, the cataloging service 82 may include a data repository, such as an XML (Extensible Markup Language) or other suitable data file (camera catalog) 115. An exemplary camera catalog 115 may maintain an entry for each fixed camera 6 selected by an organization. XML is a technology well known to those of ordinary skill in the art and is not described further in the interest of brevity. According to one exemplary embodiment, an organization may include separate entries in camera catalog 115 for each fixed camera 6, including one or more of its networked cameras and other cameras available to it.

One or more exemplary types of data may be maintained in camera catalog 115 and incorporated into the system 100. For example, Fields may include any information for locating and accessing a fixed camera 6 on an IP network, such as the URI (Uniform Resource Identifier). URI is a term well known to those of ordinary skill in the art, and is not described further in the interest of brevity.

Fields may also include an abbreviated and more recognizable caption for a fixed camera 6 in the system 100, such as the "5$^{th}$ Avenue camera."

Fields may further include identifying information about a fixed camera 6 itself, such as its make and model number.

Fields may also include information regarding the physical location of each fixed camera 6, such as the country, state or province, and city. An organization can include any other relevant information as well such as, for example, the closest street address.

Fields may include the available location data for each fixed camera 6, such as longitude, latitude, range, tilt, heading etc.

Fields may include any amount of descriptive text about each fixed camera 6, such as a description of the physical terrain being monitored by that camera and other distinguishing characteristics.

Fields may include information on how to control the available PTZ functions on a fixed camera 6. Fields may also include information enabling remote control in any direction otherwise permitted by the camera.

2. Server Configuration Options

Referring again to FIG. 1, according to one exemplary embodiment, the server software 14 may be configured to scale readily with the number of client devices. The server hardware 16 itself may support a specified number of client devices streaming live imagery and other data (e.g., location data, audio data, etc.) to and from any command center server 12 at substantially the same time. The number can vary, depending on the capacity of the particular server hardware 16 and the available network throughput. As one of ordinary skill in the art can appreciate, those are variable limitations based on the hardware and network constraints and not on the system and method according to exemplary embodiments of the invention.

The server software 14 may be configured to accommodate one or more additional client devices. First, different and/or additional server hardware 16 may be communicatively coupled to command center server 12, in which case data stored on those pieces of hardware may become an integrated pool of information. For example, command center server 12A illustrates two or more pieces of server hardware 16 communicatively coupled to one other.

Second, an organization may allocate client devices to geographically dispersed command center servers 12A, 12B. For example, in FIG. 1 command center server 12B is shown in a separate physical location from command center server 12A. As shown, command center server 12B may be configured with a single piece of server hardware 16, or in an alternate embodiment, command center server 12B can be configured with additional pieces of server hardware 16 as well to accommodate a higher data load at that physical location.

If an organization opts for geographically dispersed command center servers 12 (whether each geographic location is configured with a single piece of server hardware 16 or multiple interconnected pieces of server hardware 16), the data stored at each separate location may include a separate library that can be accessed remotely by any command center operator. In addition, the desktop application 20 may include a drop-down menu or other method allowing a command center operator to remotely access any of the organization's command center servers 12. Further, the separate command center servers 12 can be configured to exchange data among them according to an embodiment of the present invention.

Further, and as noted earlier, the system 100 may comprise one or more additional command center servers 12, such as proxy servers, data gateways, and other intervening servers, to facilitate the flow of data files to, from and among client devices within the system 100.

E. Desktop Application

Figure 4:
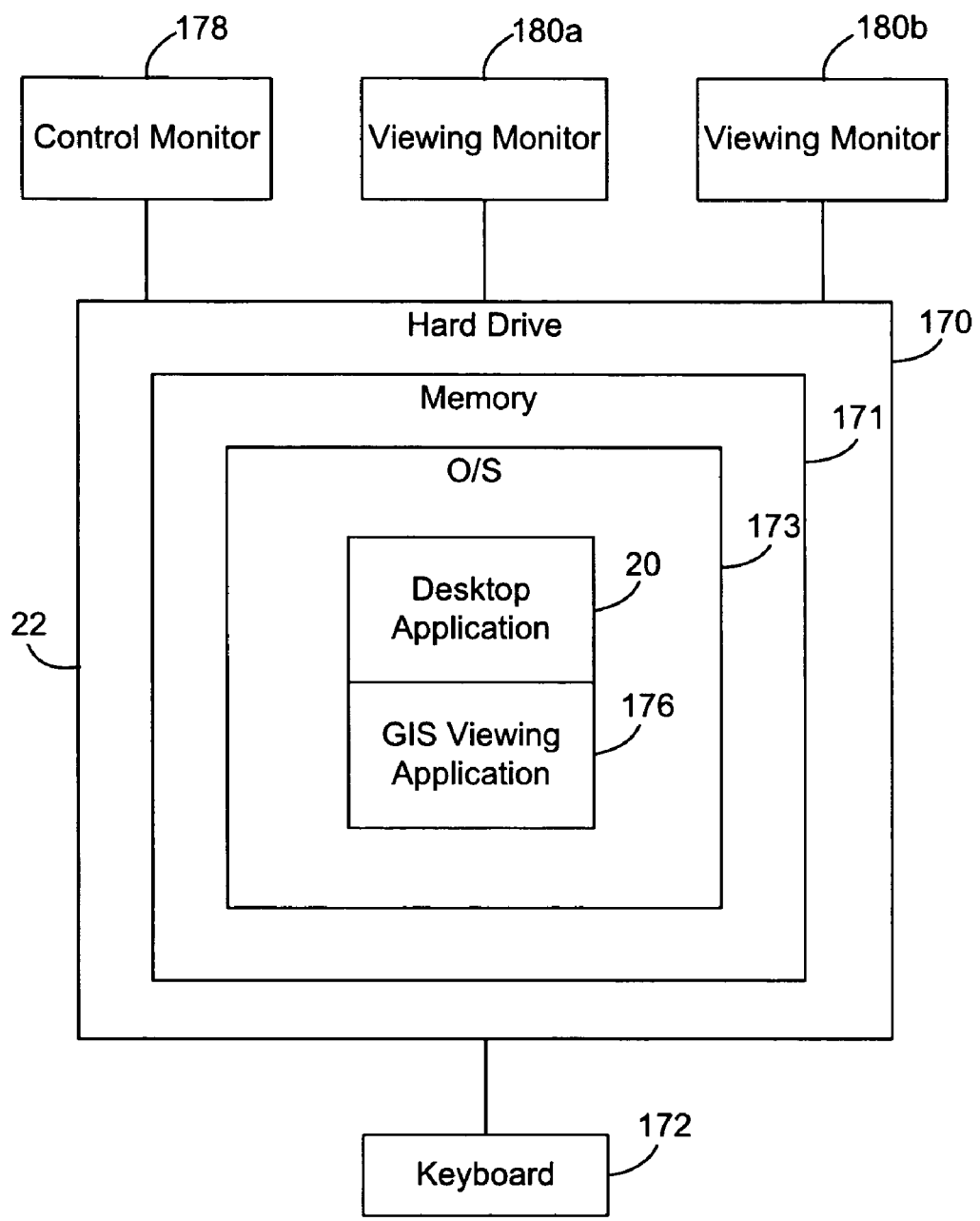
FIG. 4 is a schematic block diagram of exemplary command center computer hardware that may be used in the system shown in FIG. 1.

FIG. 4 is a schematic block diagram of an exemplary disclosed command center PC 22 that is running the desktop application 20 consistent with one exemplary embodiment. As with a desktop client device 5, command center PC 22 may include any personal computer, laptop or other fixed or mobile computing platform that is capable of running an operating system 173, such as, for example, the Windows 2000® operating system or a later version. Each command center PC 22 may also include, among other components, a hard drive 170, memory 171 and a keyboard 172. Desktop application 20 may run on the operating system 173, together with one or more integrated GIS or other available mapping applications (GIS viewing application) 176, such as the Google Earth™ viewing application. Alternatively, the GIS viewing application 176 may be a Web-based service such as, for example, Microsoft® Virtual Earth™. The command center PC 22 may include additional, fewer, and/or different components than those listed above.

As shown on FIG. 4, the command center PC 22 can further comprise one or more computer monitors or any other video display system integrated into the system 100. In the case of one or more computer monitors, for example, an exemplary control monitor 178 may display the desktop application described further below while one or more additional computer monitors—viewing monitors 180a, 180b—may display data collected through the system 100 in various formats, such as viewing image streams from the fixed cameras 6 or from any client device using one or more integrated GIS viewing applications 176. In another embodiment, an organization may use a single display monitor, as in the case of a laptop, in which case the command center operator may simply toggle between screens or display them simultaneously in separate windows, etc.

The command center PC 22 may also include any hardware and software components typically found in a computer, the details of which are omitted in the interest of brevity. The desktop application 20 will be discussed in greater detail below.

F. Access Controls

In one embodiment with respect to FIG. 2B, the system 100 may include, among other potential security protocols, various access controls which may be configured to establish permissions associated with one or more users and/or client devices associated with the system. For example, these access controls may regulate when, and under what circumstances, any party to the system 100 may exercise command and control functionality, including, for example, the ability to establish whether and under what circumstances a client device may access a particular fixed camera 6 or other client device or when one client device may remotely cause a second client device to take a particular action or to cease taking a particular action. It is further contemplated that certain authentication mechanisms (e.g., password prompts, etc.) may be provided to prevent unauthorized access to or use of the system 100.

II. Methods for Using the Client Devices

As noted earlier, the client software may comprise one or more major functions—such as the configuration function 55, the history function 56, the panic function 57, the transmit function 58, the watch function 59, the archive function 60, the upload function 61 and the command function 62—which interact with and command the capabilities of the client device. Depending on the operating system of the client device 2, each major function may be a separate software application or they may be combined into a single application, or some other variation.

Once the client software has been installed on the client device, each major function (and/or any associated subfunction) may be represented by a distinctive icon or other indicator in the client device menu system. Additionally and/or alternatively, any major function, and any associated subfunction, may include various short-cut methods allowing it to be launched (or allowing specific functionality to be exercised after it has been launched), such as by pressing a designated hardware button, or combination of buttons, on the client device or by using a customized "hot" key, or combination of hot keys, on the client device keyboard or other user interface. Those skilled in the art will recognize that particular short-cut methods available to initiate a function or subfunction may vary depending on the specific client device. Set forth below for illustrative purposes are examples of some of the types of major functions and associated subfunctions that may be incorporated into the client software. As noted earlier, and according to one embodiment, the client software is designed to function in substantially the same manner on all client devices, but the precise functionality may vary depending on the underlying functionality of the computing platform on which the client software is running. For example, as described further below, one aspect of the system 100 allows a command center PC 22 or a client device to remotely command a second client device, causing the second client device to display a live image stream from a fixed camera 6 or other source. Those skilled in the art will recognize that viewing options for a mobile client device 2 such as, for example, a commercially available smartphone, may be substantially more limiting than those for a desktop client device.

A. The Configuration Function

The configuration function 55 may comprise any number of subfunctions relating to the manner in which the client software is configured to run on the client device and to communicate with the command center server 12 and the other components of the system 100. According to one exemplary embodiment, the configuration function 55 may, for example, include a status subfunction, a server subfunction, an ID subfunction, and a location subfunction.

1. The Status Subfunction

In one embodiment, the status subfunction in the configuration function 55 may allow the client device to operate in one or more different communication modes, such as in an on-duty mode and/or an off-duty mode. According to an exemplary embodiment, the on-duty mode may be configured to ensure that the client device is in communication with the command center server 12 check-in service 110 via the applicable wireless network 4 or wired network 8 (or a combination of the two) in order to exchange available data, and off-duty mode may be configured to suspend communications between the client device and the command center server 12. In one embodiment, a user may switch between on-duty mode and off-duty mode by selecting a single command available on the client device.

In an alternate embodiment, if a user launches a different function on the client device at a time when the client device is in off-duty mode, such as if the user launches the transmit function 58 or the panic function 57, the configuration function 55 may be configured so that the client device may also automatically establish a connection to the check-in service 110 and go into on-duty mode without additional user input.

As explained for one embodiment below with respect to the routing of messages, commands, and other data within the system 100, while in on-duty mode 218, the client device and the check-in service 110 may be configured to exchange available data at a designated time interval measured in seconds, minutes or longer. By way of example, the on-duty mode can be configured to exchange available data with the check-in service 110 every 15 seconds. With each exchange, the check-in service 110 may report a connection time to a designated entry in both the last known table 96 and the position log 95, according to one embodiment.

2. The Servers Subfunction

As noted earlier, each client device 2 may be assigned to a command center server 12. In one embodiment, the servers subfunction in the configuration function 55 may allow the user to assign the client device to a particular command center server 12 or, additionally and/or alternatively, may allow the command center server 12 to remotely cause the client device to be assigned to a particular command center server 12. If, for example, the organization is using geographically dispersed command center servers 12, the organization may assign client devices 2 to different command center servers 12 at different times for different purposes.

According to one embodiment, three separate server assignments may be specified according to an exemplary embodiment:

The messaging and routing assignment may establish a connection to the server running the check-in service 110 (as shown on the preceding FIG. 3C).

The camera settings assignment may establish a connection to the server running the reception service 85 (as shown on the preceding FIG. 3C).

The viewer settings assignment may establish a connection to the server running the cataloging service 82 (as shown on the preceding FIG. 3C).

A client device may have, for illustrative purposes, been assigned to the same command center server 12 for all purposes. While that may well be a typical situation, there may be circumstances where the client device is temporarily connected to a different command center server 12 to perform a specific task. For example, a user normally assigned to a command center server 12 in Miami may be asked to transmit particular live imagery directly to a different command center server 12 located in Los Angeles. In that example, the camera settings assignment 245 may need to be changed accordingly to reflect the appropriate server address field and port field according to an embodiment of the present invention.

3. The ID Subfunction

In one embodiment, the ID subfunction in the configuration function 55 may display the unique identification name, number or other applicable identifier (device ID) which has been selected by the organization to track that client device in the system 100.

4. The Location Subfunction

As noted earlier, a client device may have an internal GPS receiver 45, an external GPS receiver 47 or other available location technology to obtain location data. In one embodiment, the location subfunction in the configuration function 55 may allow the user to engage a location technology (or to choose from a plurality of available location technologies) in order to collect the outputted location data associated with the client device and transmit the data to one or more devices associated with the system 100.

Those skilled in the art will recognize that location data may be outputted in different formats depending on the specific location technology. For example, the NMEA® (National Marine Electronics Association) format outputs GPS data in strings of data referred to as sentences, which may contain a plurality of data, including information about each satellite that is being used to triangulate a device's position. In the system 100, different methods may be used to capture and transmit outputted location data from the location technology to the command center server 12, according to an embodiment of the invention.

In one embodiment, the location subfunction may capture the outputted location data without change, store the data temporarily in the client device memory and transmit the data to the command center server 12 with the next connection to the check-in service 110. As described further below, the check-in service 110 may route the location data to the last known table 96 and the position log 95. As noted earlier, there may be separate (and identical) entries in the last known table 96 and the position log 95 to store the incoming location data based on the device ID of the transmitting client device and the nature of the specific location data. For example, the device ID of a client device may be stored in a device ID entry, latitude data may be stored in a latitude entry, longitude data may be stored in a longitude entry, altitude data may be stored in an altitude entry, etc.

In another embodiment, the location subfunction may parse the location data to extract designated coordinates (such as longitude, latitude, altitude, heading etc.), store the parsed data in the client device memory, and then transmit the parsed data to the command center server 12 with the next connection to the check-in service 110.

Additionally and/or alternatively, the outputted location data (whether parsed or without change) may be transmitted to the command center server 12 through another function such as the transmit function 58. For example, as described further below, if a client device is transmitting video data to the image service 80, the available location data may be transmitted directly to the image service 80 as well by different means, such as by sending the location data as a separate stream or by first embedding the location data into the image frames on the client device and then sending the integrated video and location data to the image service 80.

Those skilled in the art will recognize that other types of location data, alternatively and/or in addition to GPS data, may be used in system 100. For example, in another embodiment, the command center server 12 is designed to allow integration with any available location-based service offered by the commercial wireless carriers through the federally-mandated E911 initiative (all such data being referred to generally as the E911 data), as described further below.

Figure 5A:
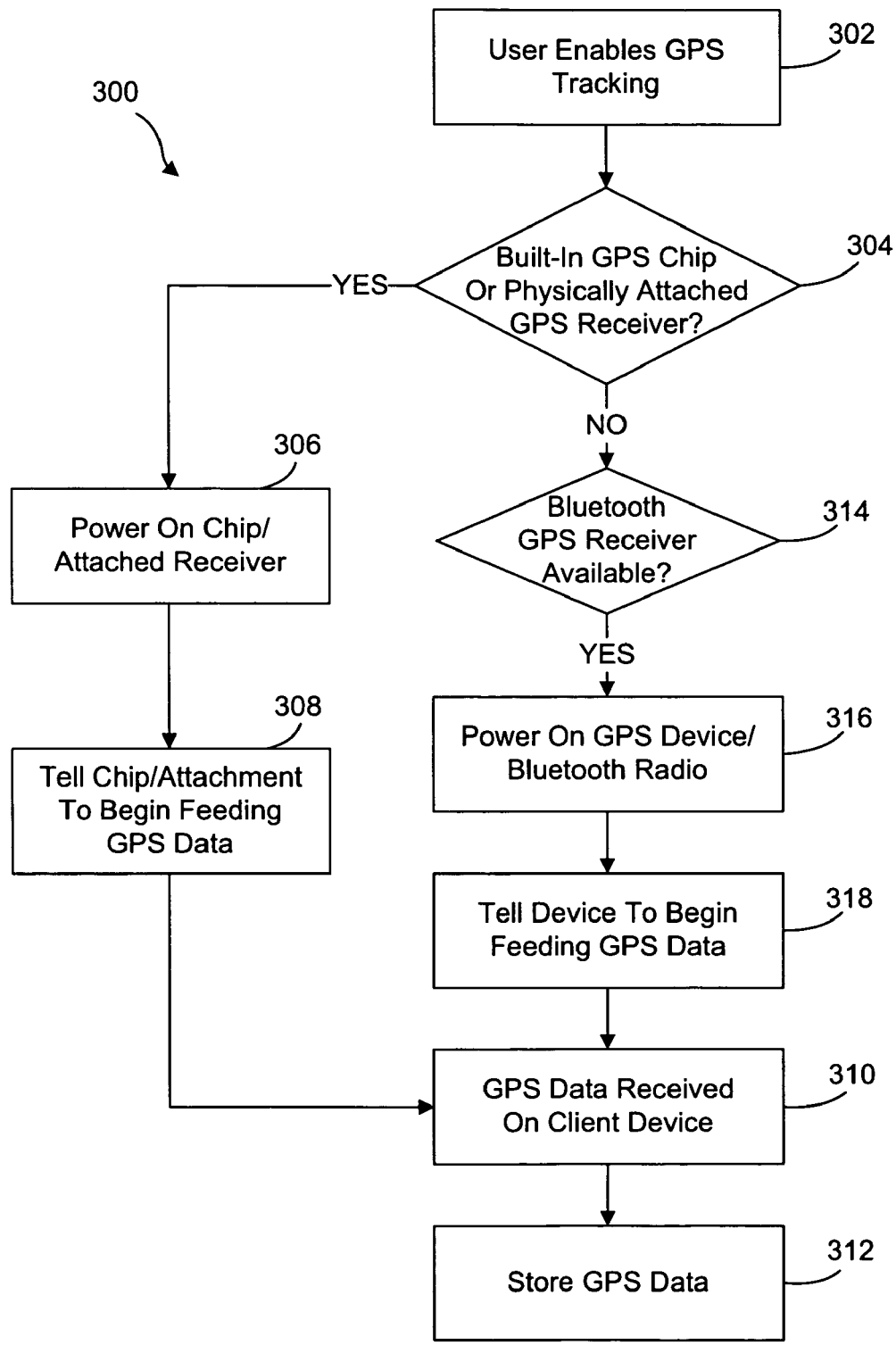
FIGS. 5A-5D illustrate an exemplary configuration process running on an exemplary client device that may be used in the system shown in FIG. 1.
Figure 5B:
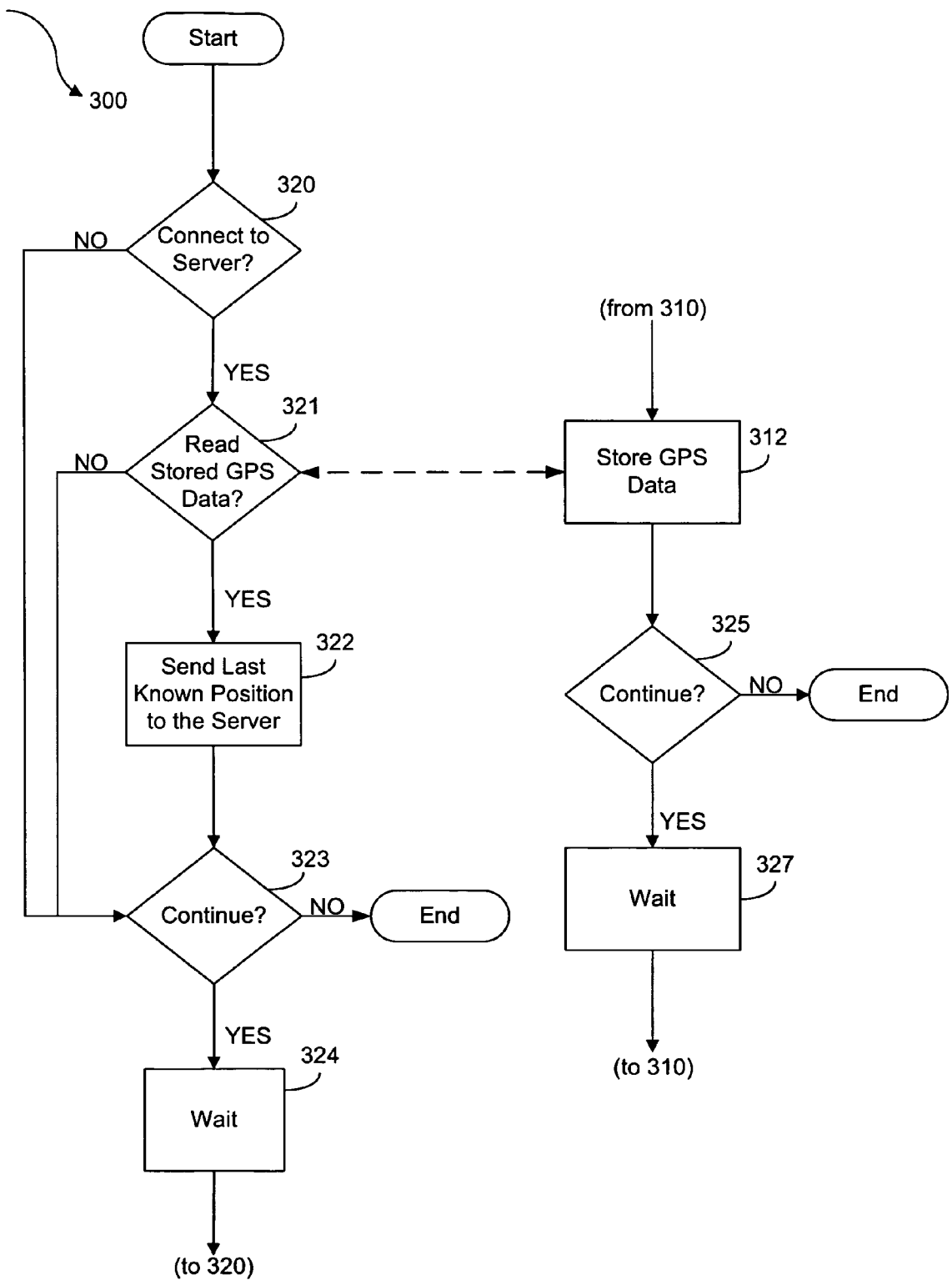
Figure 5C:
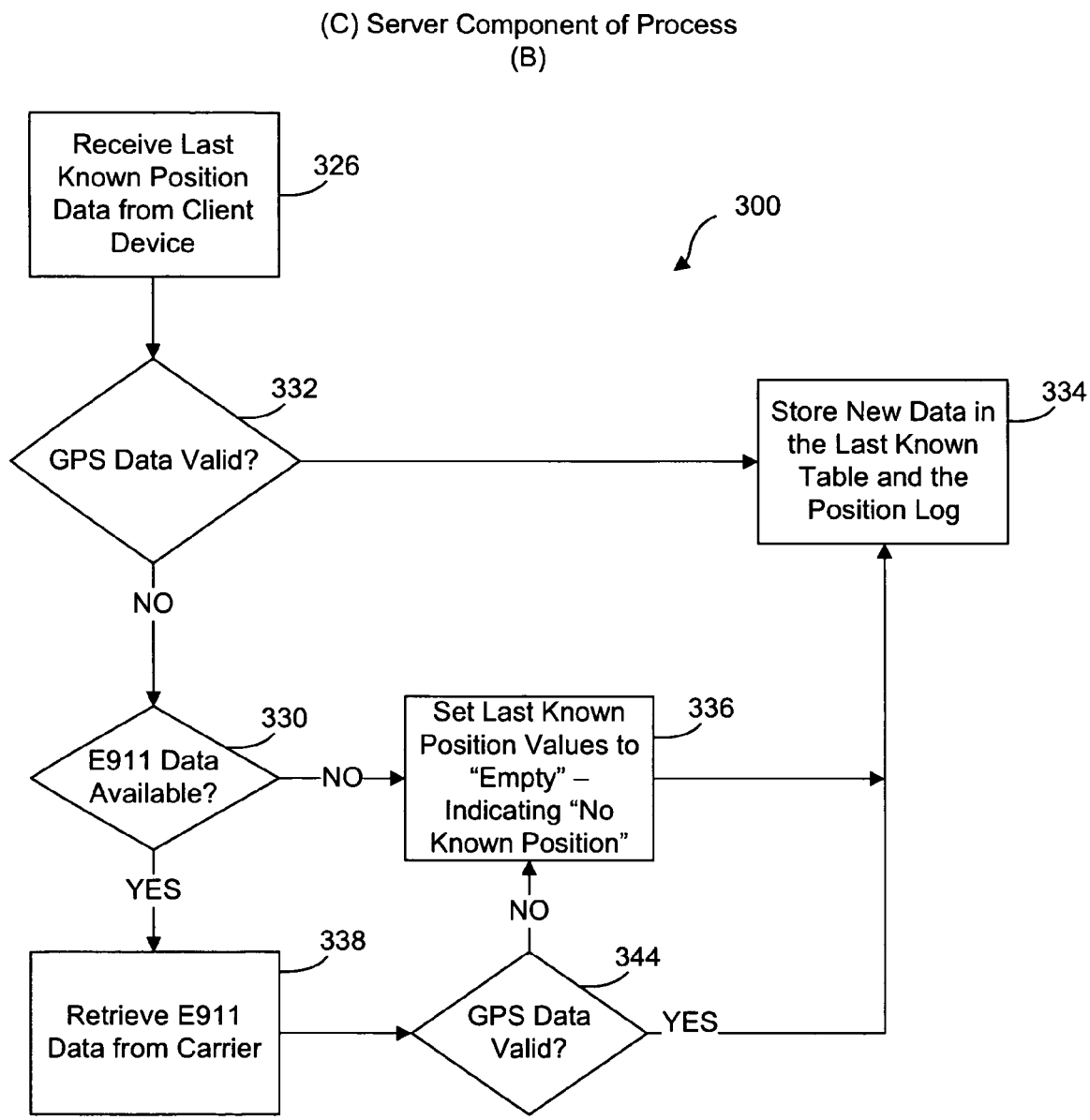

FIGS. 5A-5C illustrate a flow diagram of an exemplary method 300 that may be used when a user has access to two or more methods for retrieving location data. One of ordinary skill will further recognize that the specific steps involved may vary depending on the functionality of the client device and the underlying location technology, the nature of the location data being transmitted by the location technology, the manner in which client device and the location technology are communicatively coupled, and/or how the location data is processed by the command center server 12. Thus, the following discussion of steps 302-344 is intended to provide illustrative examples of the steps that may be undertaken by method 300, according to one embodiment of the present invention.

As shown in FIG. 5A, method 300 may begin with step 302, in which the user seeks to engage a location technology on the client device. In step 304, method 300 may determine whether the client device has an internal GPS receiver 45 or a physically attached external GPS receiver (in either case, an attached GPS receiver).

If the client device has an attached GPS receiver, ("yes" path from step 304), the user may power on the attached GPS receiver using any method otherwise permitted by the attached GPS receiver (Step 306). As described earlier, the user may engage the location subfunction to commence retrieving GPS data from the GPS receiver (Step 308); the location subfunction may receive (and, if so configured, parse) the incoming GPS data (Step 310); and the relevant GPS data may be stored temporarily on the client device (Step 312). Additionally or alternatively the relevant GPS data may be streamed to the image service 80 through the transmit function 58.

If the client device does not have an attached GPS receiver ("no" path from step 304), method 300 may determine whether any other type of external GPS receiver 47 or other available location technology is available, such as, for example, a Bluetooth-enabled GPS receiver connected via a wireless network 4 to the client device (Step 314). If a location technology is available ("yes" path from step 314), the user may power on the location technology using any method permitted by that technology (Step 316). The user may engage the location subfunction to command the device to begin feeding the GPS data in the manner set forth above (Step 318); the location subfunction may receive (and, if engaged, parse) the incoming GPS data (Step 310); and the relevant GPS data may be stored temporarily on the client device (Step 312).

As shown on FIG. 5B, method 300 determines in Step 325 whether the user wishes to continue to retrieve GPS data. In some situations, for example, the user may have decided to turn off an attached GPS receiver or there may be an error condition (such as a hardware or software failure on the GPS receiver or a loss of connectivity) interrupting the connection. If the user wishes to continue (Step 326: Yes), method 300 will wait a designated interval before the location sub function proceeds to retrieve incoming GPS data (Step 310, as described earlier). If the user does not wish to continue (Step 326: No), the retrieval of GPS data will end until the user next engages the location subfunction.

As further shown on FIG. 5B, method 300 determines in step 320 whether a successful connection has occurred between the client device and the command center server 12. If a successful connection has occurred (Step 320: yes), method 300 will determine in step 321 whether there is any stored GPS data. If there is stored GPS data (Step 321: yes), the GPS data may be transmitted in step 322 from the client device to the command center server 12. If there is no stored GPS data (Step 321: no), method 300 may wait until the next successful connection to the command center server 12 to again determine whether there is any stored GPS data.

If a successful connection has not occurred between the client device and the command center server 12, the GPS data may remain stored on the client device memory until the next successful connection to the command center server 12 (Step 312).

As shown on FIG. 5C, in step 326 the GPS data may be received by the command center server 12. In step 332, the command center server may determine whether the GPS data is valid. The validity determination in step 332 may encompass such criteria as the age of the data, fix quality and horizontal dilution, among others.

If the GPS data is valid ("yes" path from step 332), the command center server 12 may in step 334 route the GPS data to the last known table 96 and the position log 95, as described above. If the GPS data is not valid ("no" path from step 332), the method 300 may proceed to step 330.

In step 330, method 300 may determine whether location data from another source, such as E911 data, may be available for the client device. If there is no location data available from another source ("no" path from step 330), method 300 may in step 336 set the last known position values to "Empty"— indicating that no known position is currently available—and route that information to the last known table 96 and the position log 95. If there is location data available ("yes" path from step 330), method 300 may proceed in step 338 to retrieve the available location data, either through the client device or directly from the wireless carrier.

In step 344, method 300 may determine whether the other location data is valid. As noted earlier in the case of step 332, the validity determination in step 344 may encompass such criteria as the age of the data, fix quality and horizontal dilution, among others. If the other location data is valid ("yes" path from step 344), that information may be routed to the last known table 96 and the position log 95. If the other location data is not valid ("no" path from step 344), method 300 may in step 336 set the last known position values to "Empty"—indicating that no known position is currently available—and route that information to the last known table 96 and the position log 95 (step 334).

5. On-Duty Mode

Figure 5D:
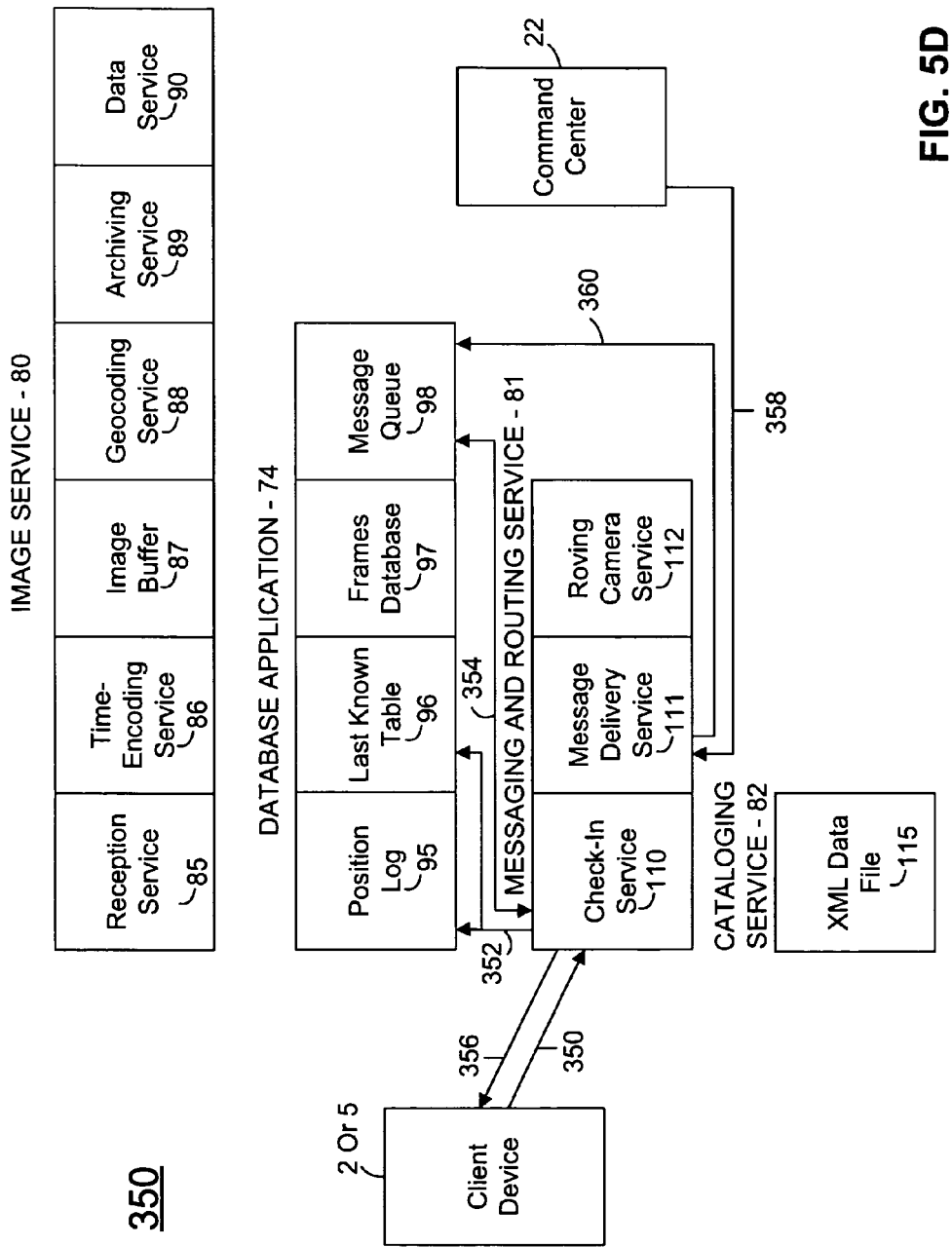

FIG. 5D is a schematic block diagram illustrating an exemplary data flow 350 by which a client device may transmit and receive data while in on-duty mode. As noted earlier in one embodiment, at a predetermined time interval, the client device may in path 350 communicate with the check-in service 110. At that time, the client device may be configured to transmit to the check-in service 110 its device ID and any available location data. In addition, at the same time or at other designated intervals, the client device may be configured to transmit other designated data as well relating to the client device (or to any other device that may be communicatively coupled with the client device), such as battery level, available broadband networks, signal strength etc. The check-in service 110 may then in path 352 route that data to the position log 95 and the last known table 96. At the same time, the check-in service 110 may in path 354 retrieve any pending messages or commands from the message queue 98 and route them in path 356 to the client device. As noted earlier, the message queue 98 may temporarily store messages, commands and other data communications that have previously been sent in path 358 from command center PC 22 or another client device to the message delivery service 111, which in turn may route them in path 360 to the message queue 98. The process of sending messages, commands and other data communications to, from and among client devices is discussed in greater detail below.

B. The History Function

As noted earlier, in one embodiment, a user may access a history function 56 on the client device which may maintain, along with other information, an updated record of each instance in which the client device has received a message, command or other data communication from command center server 12, together with associated information such as the date and time that the communication was first sent to the client device and the identity of the sender.

For example, the history function 56 may show that a client device previously received a command from the command center PC 22 or another client device on Nov. 30, 2006 at 11:18 pm to cause a specific image file to be displayed automatically on the client device display screen. In one embodiment, if the user highlights that specific action, the original image file may be retrieved from the command center server 12 (or, if applicable, an updated version of that image file since it was first distributed to the client device) and again displayed on the client device.

In one embodiment, the user may clear all or part of the historical record at any point by accessing a drop-down menu or other selection method incorporated into the history function 56.

C. The Panic Function

In one embodiment, the panic function 57 may allow a user to initiate a panic mode causing the client device to send an immediate alert (silent or otherwise) to the command center server 12 and automatically initiate the transmit function 58 on the client device, if available. The client device display screen may also display a panic message confirming to the user that the panic function 57 has been launched.

In one embodiment, a user may also use multiple methods to cancel the panic mode, including, for example, by exiting the transmit function 58 at any point if it is then engaged. In one embodiment, command center PC 22 may also terminate panic function 57 remotely and automatically by sending a designated command to the client device.

D. The Transmit Function

A transmit function 58 may allow a user to capture and transmit live video from the client device to the command center server 12 image service 80 in many different ways. In one embodiment, live audio may be transmitted with, or instead of, the live video. For example, a user may first record and transmit an explanatory audio message (e.g., "I'm about to send you video of . . . ") and then transmit the live video stream or alternatively the audio and video may be transmitted contemporaneously, in one embodiment.

In another embodiment, a user may assign a priority tag to certain image frames as the video stream is being sent to the command center server 12 in a manner that does not interrupt the data transmission. By way of illustration, a user may wish to tag a particular two minutes of a 30 minute transmission by selecting a single key or combination of keys or other available methods to commence the priority tagging and then selecting the same or different keys to terminate the tagging. As described further below, the user may then, in one embodiment, subsequently search for and retrieve those frames based on the priority tagging.

In yet another embodiment, location information and other applicable data, such as sensor data (e.g. temperature, radiation levels, etc.) may also be transmitted, with or without live video and/or audio data. Additionally and/or alternatively, and as noted earlier, such data may also be captured and transmitted from the client device to the command center server 12.

Figure 6:
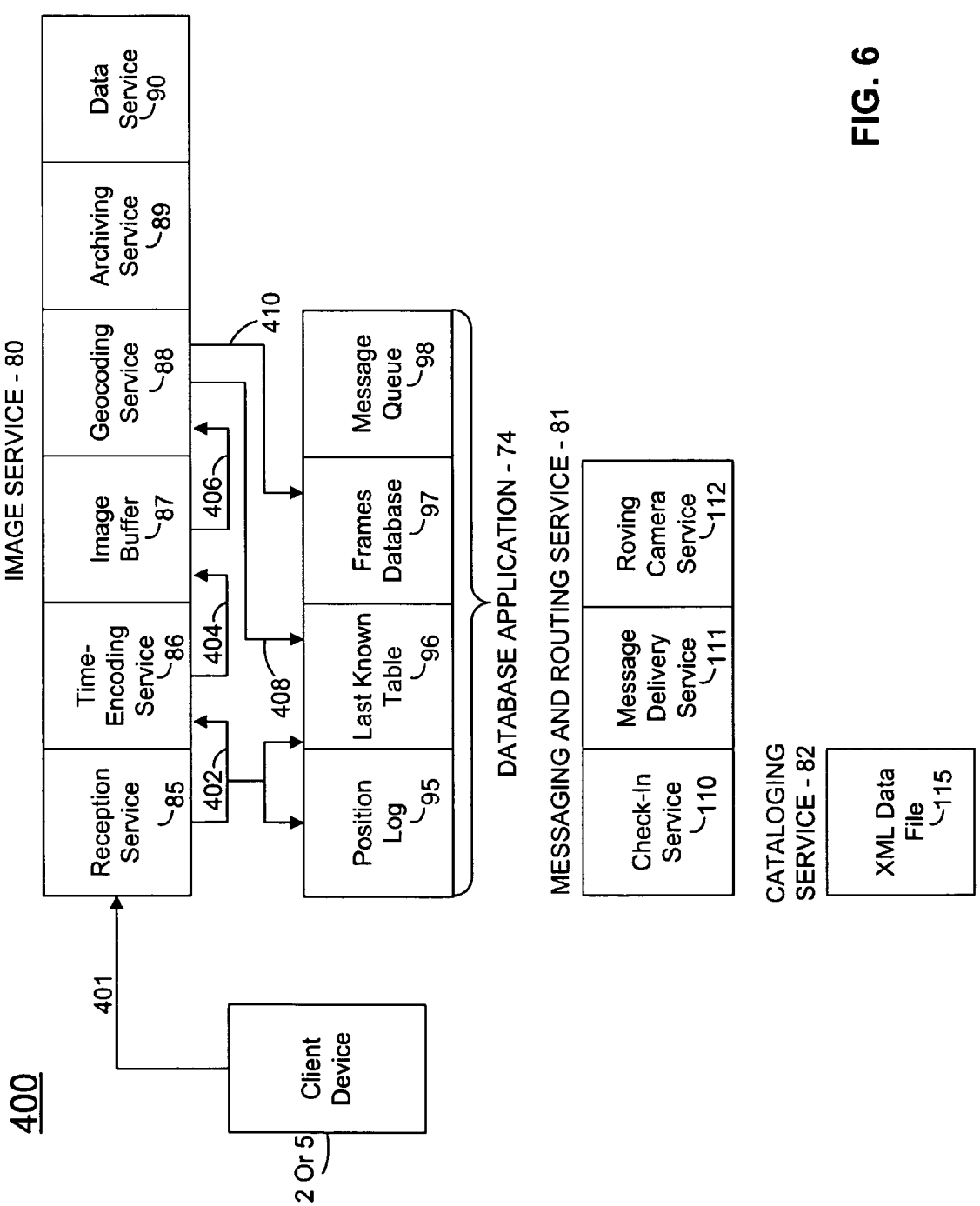
FIG. 6 provides a block diagram illustrating operation of an exemplary transmit function running on an exemplary client device that may be used in the system shown in FIG. 1.

FIG. 6 is a schematic block diagram illustrating an exemplary data flow 400 by which the transmit function 58 may allow a user to capture and transmit live video from the client device to the command center server 12. In the embodiment shown:

- In path 401, an reception service 85 may receive live video images captured by the client device—together with other designated data captured by the client device such as audio files, sensor data etc.—and transcode them into the applicable file format. The process of capturing live video images on the client device is discussed in greater detail below.
- In path 402, each image frame may then be routed to a time-encoding service 86, which may incorporate the current date and time into each frame's image format and other relevant data. In addition, the reception service 85 may send a notification to designated entries in the last known table 96 and the position log 95 that the transmit function 58 has been launched, according to one embodiment.
- In path 404, each frame may then be stored temporarily in an image buffer 87 on a first-in, first-out basis.
- In path 406, each frame may then be routed to a geocoding service 88.
- In path 408, the geocoding service 88 may retrieve from the last known table 96 the last known location data for the client device (as discussed earlier) and, if applicable, reformat the image frame to incorporate those coordinates as well, according to one embodiment. Alternatively, as noted earlier, the location data may already have been incorporated into the image frames by the client device.
- In path 410, the geocoding service 88 may then route each image frame to the frames database 97 for storage and subsequent retrieval, according to an embodiment of the present invention.

In another embodiment, system 100 may employ a similar method to capture and transmit live audio, sensor data and other available data files from the client device. One of ordinary skill will recognize that the specific steps involved will vary depending on the nature of the data files being transferred. For example, the transfer of audio or sensor data in addition to, or in lieu of, live video images may or may not require its own compression technology and other variations depending on the size and characteristics of the data files involved. Thus, the preceding discussion of paths 401-410 is intended to provide illustrative examples of the steps that may be undertaken by data flow 400, according to one embodiment of the present invention.

1. Image Attributes

One of ordinary skill in the art will appreciate that the specific process of capturing and transmitting live video images from the client device may vary depending on the specific functionality of the client device, including variables such as the nature of the operating system installed on the device, the available application programming interface (API) and whether the camera is embedded in the device or communicatively coupled with it. The following discussion is intended to provide an illustrative example of the type of steps that may be taken to capture and transmit live imagery from the client device. For illustrative purposes, it is assumed that the client device has an embedded camera, but a substantially similar method may be employed to the extent the camera is communicatively coupled to the client device, according to an embodiment of the present invention.

In one embodiment, the client device has embedded in it an image management library, for example, as installed by the hardware manufacturer. The library has the ability to manipulate the raw image data being collected by the sensors of the client device's embedded camera in multiple ways, including the ability to capture raw image data, format it as image frames, and save the frames to a photo library maintained on the client device. Additional information about image management libraries is omitted for reasons of brevity, as those of ordinary skill in the art of the present invention understand their operations.

In a further embodiment, the transmit function 58 may use the available image management library API to programmatically manipulate the raw image data collected by a client device and stream it directly to the reception service 85 of a command center server 12. As described further below, while the transmit function 58 is engaged, it may retrieve raw image data using the device API, format it in a JPEG or other suitable format and compress it for transmission to the command center server 12. In one embodiment, this may occur approximately every 1/10 second. At the same time, if desired, the user may view on the client device display screen the live imagery as it is being transmitted.

In another embodiment, the transmit function 58 may not import the image compression function from the image management library if a more efficient third-party compression technology is available. This may be desirable to optimize the speed at which individual image frames are transmitted to command center server 12. No additional information is provided about third-party compression applications that may be integrated into the transmit function 58, as compression processes are well understood by those of ordinary skill in the art.

In another embodiment, each image frame may be watermarked for authentication purposes. Digital watermarks are generally used for one or more purposes such as, for example, data monitoring, copyright protection and data authentication. Digital watermarking can be either visible or invisible to the viewer. A visible watermark is primarily designed to display a copyright notice, telling the viewer who owns the image rights. An invisible watermark can also be used to assert a copyright, but it is designed to catch those persons who may try to infringe on the copyright by using the image without the owner's permission. Watermarks can also be used to authenticate the integrity of an image. When used for this purpose, a software program is used to calculate a unique number using the image data. To establish specific ownership of the image, an encryption key assigned to the owner of the image can be used to encrypt the unique number generated from the image. The encrypted number is then inserted, by various methods, into the image itself. If ownership is not important, then only the unencrypted value is used. Though the actual techniques used are complex and vary from one manufacturer to another, the process of inserting this value into the image alters the image data.

2. Image Quality Control

In one embodiment, while the transit function 58 is transmitting live video images, the user may adjust the image quality, such as through the use of a slide control that, for example, may be accessed through a drop-down menu or other selection method incorporated into the transmit function 58.

The use of a slide control or other alternative method may allow the user to make a tradeoff (or to be directed by a command center operator to make a tradeoff) within a certain pre-determined range between image quality and the speed at which imagery is transmitted to command center server 12. For example, the user may use the applicable image quality control to change the image resolution or the compression level. In another embodiment of the present invention, a command center operator or another client device may remotely alter the transmitted image quality on the transmitting client device by sending the appropriate command to the transmitting client device.

E. The Watch Function

According to one embodiment, the watch function 59 may operate on the client device in a minimum of two modes: a search mode and a viewing mode.

1. Search Mode

According to one embodiment, a client device display screen may be configured to display a search mode when the watch function 59 is launched on the client device. The search mode may include four subfunctions according to one embodiment: a favorites subfunction, a browse subfunction, a find subfunction and a roving subfunction.

As described in more detail below, and according to an exemplary embodiment:

A favorites subfunction may allow the user to maintain on the client device a directory of bookmarked fixed cameras 6 and other client devices that may be accessed easily to view live video images being sent by them.

A browse subfunction may allow the user to remotely search for available fixed cameras 6 based on different criteria, such as geographic location.

A find subfunction may allow the user to remotely search for available fixed cameras 6 by using a simple text search.

A roving subfunction may allow the user to remotely search for and view live video images being transmitted by another client device.

(a) The Favorites Subfunction

In one embodiment, a favorites subfunction may allow the user to use different methods to bookmark on the client device any fixed camera 6 or other client device for subsequent selection and live viewing. In one embodiment, for example, a user may select a command shown on the display screen while the watch function 59 is engaged. Once the user has selected a particular camera for bookmarking, it may then appear automatically on the list of bookmarked cameras appearing in the favorites subfunction, with or without a separate notification alerting the user as to whether that bookmarked camera is then streaming live imagery, according to one embodiment. The user may then select any bookmarked camera for immediate live viewing (if then available) through the watch function 59 viewing mode described further below.

(b) The Browse Subfunction

In one embodiment, a browse subfunction in the watch function 59 may allow the user to remotely search for fixed cameras 6 available in the catalog service 82 (as shown on the preceding FIG. 3C) based on different criteria, such as the camera's geographical location. The browse subfunction may include various search methods, such as, for example, a hierarchical ordering of the data in a tree format or through the use of pull-down lists or other applicable user prompts. According to one embodiment, each time the watch function 59 is launched on the client device, the browse subfunction may establish an available connection to the cataloging service 82 in order to search its camera catalog 115 to populate the applicable user prompts.

In other embodiments, the user may select the applicable search criteria in order to produce a resulting list of fixed cameras 6 available for viewing.

As noted earlier, if an organization has geographically dispersed command center servers 12, and each corresponding cataloging service 82 maintains a different camera catalog 115 (such as each regional office maintaining a database of its regional fixed cameras 6 only), then in one embodiment the user may remotely access the different cataloging services 82 by changing a viewer settings assignment on the client device to the relevant command center server 12 (or by having the command center server 12 remotely change the viewing settings assignment).

(c) The Find Subfunction

In one embodiment, a find subfunction in the watch function 59 may allow the user to remotely search for fixed cameras 6 available in the catalog service 82 by using a simple text search. Each time the find subfunction is accessed, the user may be directed on the client device display screen to a query field, according to one embodiment. To initiate a search, the user may type one or more letters, numbers or other characters (collectively, query terms) in the query field to initiate the search or simply select a separate option to poll all of the cameras in the catalog service 82. The find subfunction may then establish an available connection to the cataloging service 82, which may search its camera catalog to identify a list of available fixed cameras 6 that have the query terms in any of their respective camera catalog fields. A user may then select any available fixed camera 6 and display the live image stream from that camera on the client device display screen.

(d) The Roving Subfunction

In one embodiment, a roving subfunction in the watch function 59 may allow the user to remotely search for and view live video images while they are being simultaneously transmitted by another client device to a command center server 12.

Figure 7:
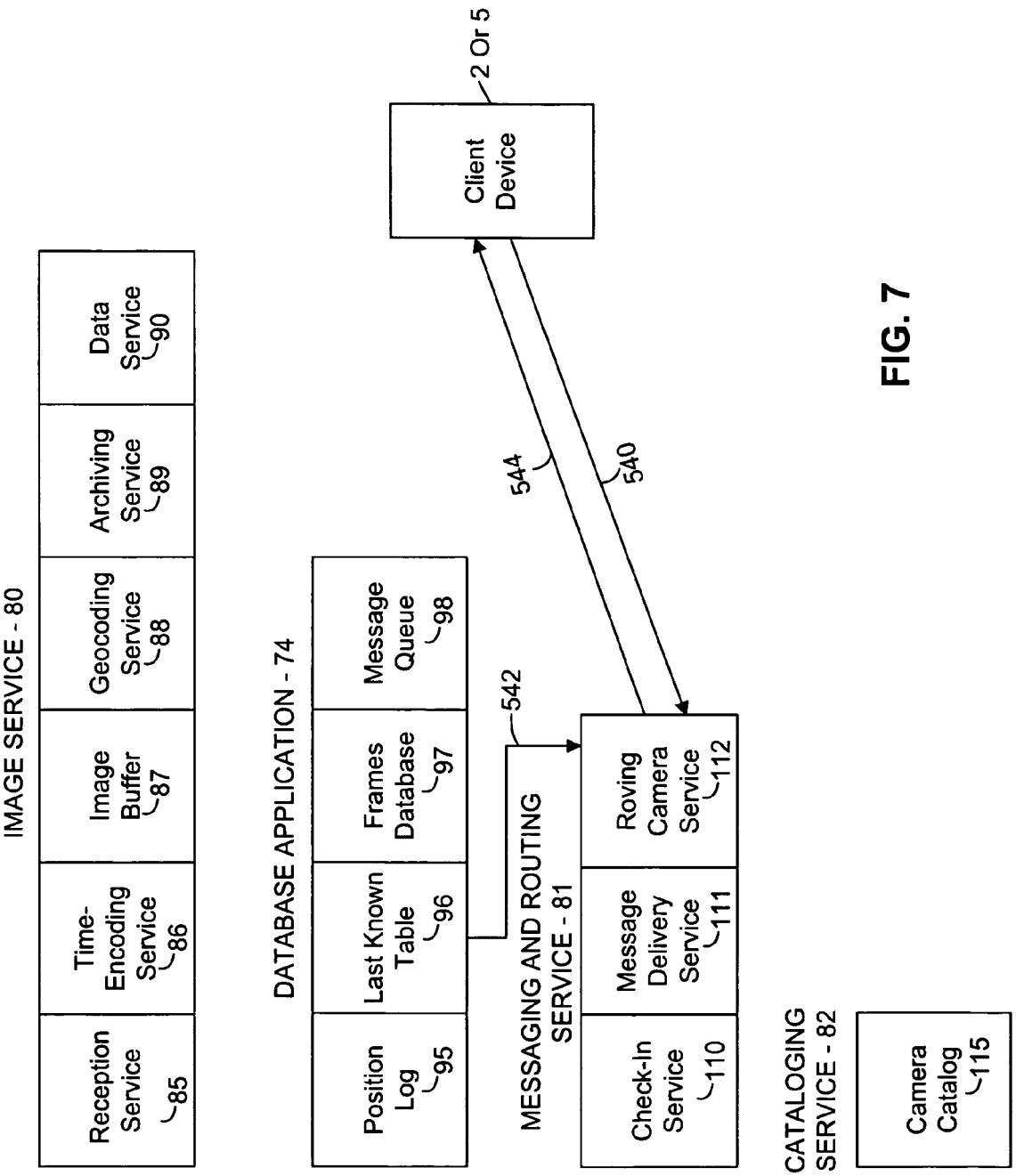
FIG. 7 provides a block diagram illustrating an exemplary watch function running on an exemplary client device that may be used in the system shown in FIG. 1.

As illustrated by the exemplary data flow diagram shown on FIG. 7, when the roving tab has been selected the roving subfunction may, in path 540, establish an available connection to the roving camera service 112 of the messaging and routing service 81 and request a list of available client devices. In response, the roving cameras service 112 may first determine what other client devices are then connected to the same messaging and routing service 81. In path 542 the roving camera service 112 may then communicate with the last known table 96 in the database application 74 to determine which of those client devices are then transmitting live video. Based on the determination, the roving camera service 112 may then in path 544 report the resulting information back to the roving function. The resulting list of client devices may appear on the client device display screen. The user may then select any resulting client device to display the live video stream from that device.

As with the desktop application 20, the watch function 59 and other components of the client software may incorporate various additional filtering and sorting options as well, including, for example, the ability to further refine search results, according to one embodiment.

2. Viewing Mode

As noted earlier, the watch function 59 viewing mode may display any live imagery selected by the user through the watch function 59 search mode that may be streaming by a fixed camera 6 or by another client device. In one embodiment, the method for displaying the live imagery on the display screen varies depending on whether the user has selected a fixed camera 6 or another client device. As noted earlier, the manner in which the live imagery is displayed on the client device may also vary depending on the underlying functionality of the client device, among other potential variables.

(a) Fixed Camera Viewing

In one embodiment, if the user has selected a fixed camera 6 during the search mode, the watch function 59 may retrieve from the cataloging service 82 the IP network information needed to access the fixed camera 6 directly from the client device. As noted earlier, that information may include the URI identified in one or more camera catalog fields. With the IP network information, the watch function 59 may assemble the unique URI of the fixed camera 6 and cause the client device display screen to commence displaying the live image stream from that fixed camera 6. In an alternative embodiment, an intervening command center server 12 may be used in the system 100 to act as a proxy server between the fixed cameras 6 and the client devices. In that case, the intervening server 12 may establish the direct connection to the fixed camera 6, and the watch function 59 may use the unique URI of the intervening server 12 to cause the client device to display the live image stream from that fixed camera 6. As noted earlier, the use of a proxy server may permit multiple simultaneous requests by client devices to access one or more fixed cameras 6 that may otherwise be limited in the number of direct simultaneous connections they will support.

Once the watch function 59 has established a direct or indirect connection to the fixed camera 6, a user may use various methods to exit the watch function 59 viewing mode and return to the watch function 59 search mode, such as, for example, by selecting a menu option on the client device display screen.

(b) Mobile Client Device Viewing

Similarly, if the user has selected a client device during the search mode, the watch function 59 may establish a direct IP connection to the image buffer 87 on the command center server 12 that is temporarily storing the live image stream transmitted by that client device, and thereby commence displaying that live image stream on the display screen. According to one embodiment, the watch function may compute the IP address of the appropriate image buffer 87 based on the device ID of the transmitting client device and on the IP address of the command center server 12 which is receiving the live image stream (that is, the IP address shown in the server address field in the camera settings assignment, according to one embodiment).

(c) PTZ Controls

As noted earlier, an organization may include in camera catalog 115 information on how to control remotely the available PTZ movements for a fixed camera 6. According to an exemplary embodiment, when the watch function 59 is in view mode, it may request PTZ information from the cataloging service 82 and store it temporarily on the client device memory. If there is available information, the letters PTZ may appear on the display screen and the user may be able to remotely control the available PTZ movements from the client device. By way of example, if the information is available in camera catalog 115, the user may be able to remotely cause the fixed camera 6 to move to the extent otherwise permitted by the fixed camera 6.

(d) Playback Controls

In one embodiment, the client software may incorporate a separate image buffer which may temporarily store on the client device any live image stream displayed on the client device from a fixed camera 6, another client device or another source and allow the user to exercise various playback and distribution functions. According to one embodiment, this is substantially the same type of functionality available to a command center operator running a command center PC 22, and the process for doing so is discussed in greater detail below.

F. The Archive Function

In one embodiment, the archive function 60 may allow a user to remotely search for and view archived imagery previously captured by the system 100. As described in greater detail below, the client device may establish a connection to the archiving service 89 (shown on the preceding FIG. 3C) to process requests to view the archived images.

G. The Upload Function

In one embodiment, the upload function 61 may allow a user to remotely upload any image file (.jpg, .bmp, .gif etc) or other data file from the client device to the command center server 12 for storage and immediate or subsequent redistribution within the system 100. The uploaded data file may originate from numerous sources, including, for example, the client device itself (hard drive, flash drive, disc, DVD-ROM, etc.), or from another data collection source that is communicatively coupled to the client device, or from an uncoupled source, such as a separate digital photo or other data file stored on a compact flash, SD card or other media.

The uploaded file may be processed in different ways in the system 100 depending on its characteristics. An image file, for example, may be processed by the image service 80 and stored in the frames database 97 in substantially the same manner as a live video stream from a client device. Other data files, such as sensor data, may be received, processed and stored differently by the command center server 12 based on their specific characteristics.

H. The Command Function

In one embodiment, the command function 62 may allow the user to exercise on the client device some, all or none of the command and control functionality that a command center operator may exercise from the command center PC 22 with respect to the creation and communication of data files within the system 100. In one embodiment, this functionality may be accomplished through the command center server 12 messaging and routing function described further below.

III. Methods for Using the Desktop Application

As noted earlier, embodiments of the desktop application 20 may be configured to work with a single viewing monitor (as on a laptop, for example) or in a multi-monitor setup or other video display system that may, for example, have a single control monitor 178 and one or more viewing monitors 180a, 180b (as shown on the preceding FIG. 4), or other suitable viewing displays. For illustrative purposes, the following discussion describes how one embodiment of the desktop application 20 may work with one control monitor 178 and one viewing monitor 180 placed side-by-side. In embodiments consistent with the invention, the desktop application can be loaded onto the command center PC, or be a Web-based application that is accessed by the command center PC through its Web browser. Alternatively and/or additionally, the desktop application may include a stand-alone application suitable for downloading and use on a client device or other available computing platform.

According to one embodiment, when the desktop application 20 is opened on the command center PC 22, a management console may appear on the control monitor 178 and one or more GIS viewing applications 176 may be opened also for viewing on the viewing monitor 180. The mapping data available through one GIS viewing application 176 may be integrated into the viewing display of one or more different GIS viewing applications 176. Those skilled in the art will recognize that there are many different GIS viewing applications 176 available, each of which may include its own customized format and functions. The desktop application 20 may be designed to work with any GIS viewing application 176 according to its application programming interface.

A. Fixed Camera Search Function

In one embodiment, each time the desktop application 20 is launched, the management console may automatically poll the cataloging service 82 and present a list of all the available fixed cameras 6 in various formats.

B. Fixed Camera Viewing Function

In one embodiment, once the list of available cameras is displayed on the management console, the command center operator may use various methods to select any one or more of the listed cameras, including, for example, by clicking on a listed camera or by selecting one or more available menu options. Once a camera is selected, the desktop application 20 may retrieve from the command center PC 22 memory 171 the available URI for the selected fixed camera 6 (as the watch function 59 may do so when viewing a fixed camera 6 from a client device, as discussed earlier). The desktop application 20 may then open a direct IP connection to that fixed camera 6 and open a viewing window on the viewing monitor 180 to display the live image stream from that camera.

As described in greater detail below and according to one exemplary embodiment, each viewing window may have its own dedicated image buffer (separate from the image buffer 87 maintained in the command center server 12), which temporarily records the live image stream and may allow the command center operator to exercise various playback controls, including the ability to pause, rewind and fast-forward through the image stream, and to distribute recorded images within and outside an organization via system 100.

In one embodiment, the command center operator may have additional viewing options if camera catalog 115 includes location data for a selected fixed camera 6. If there is no available data, a GIS viewing application 176 may not become engaged while the viewing window is open on the viewing monitor 180. If there is available location data, the management console may be configured to allow that location data to be visualized on the viewing monitor 180. Among other potential visualization options:

One or more GIS viewing applications 176 may be engaged to display the available location data, with the ability for the management console operate to flag each camera's location and manipulate the display format to show any mix of available location data (e.g., show just the longitude and latitude, or show the longitude and latitude with altitude and heading etc.)

Figure 11:
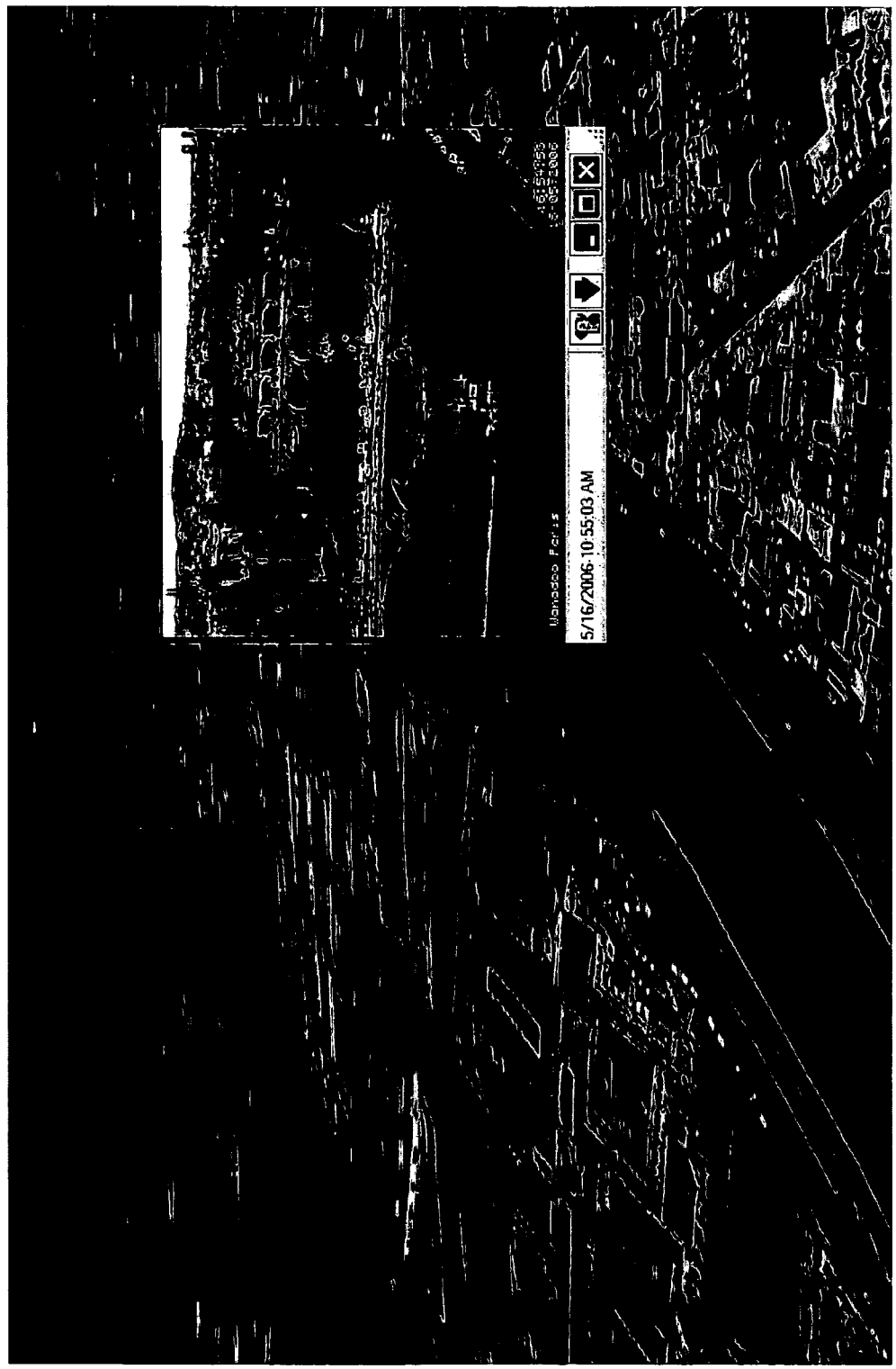
FIG. 11 includes a screenshot of an exemplary location image overlaid with an exemplary streaming video pane, according to an exemplary method for viewing streaming data according to the disclosed embodiments.

The viewing window may manually or automatically be opened on top of its available location data in order to better visualize how the live video stream appears against the underlying fixed imagery, such as a satellite or aerial photo or other available display from a GIS viewing application 176. FIG. 11 illustrates a screen shot of a viewing monitor 180 showing a viewing window of a fixed camera in Paris, France placed on top of the same intersection that the fixed camera 6 is viewing. In an alternative embodiment, the desktop application 20 may incorporate image analysis tools to analyze the incoming image stream from the fixed camera 6, analyze the underlying fixed imagery, and cause the viewing window to be placed at one or more particular places on the viewing monitor 180, such as the place in the underlying satellite imagery that most closely matches the view being streamed from the fixed camera 6.

Figure 12:
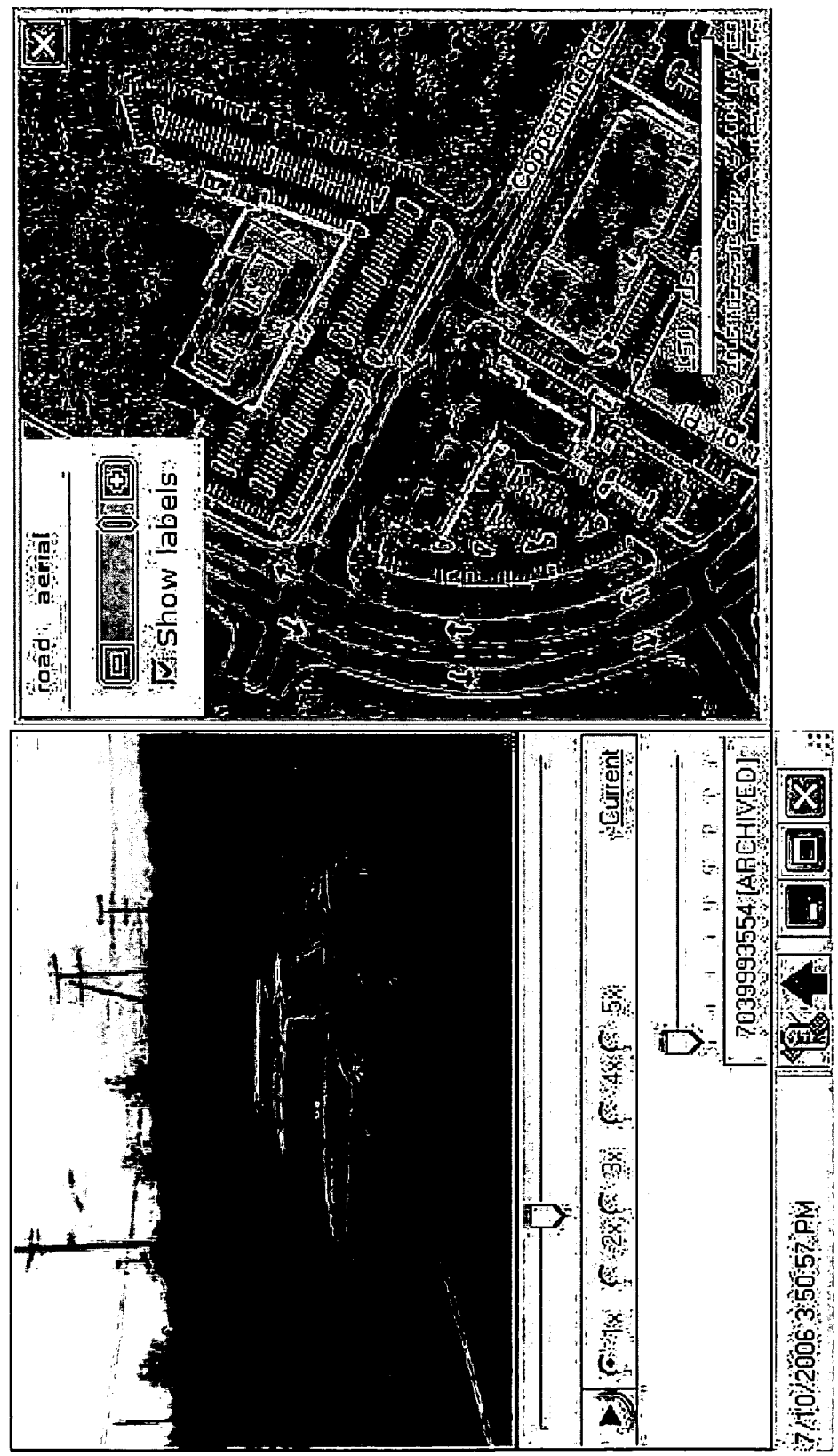
FIG. 12 includes a screenshot of an exemplary streaming video pane with an exemplary map window attached to it showing its originating location, according to an exemplary method for viewing streaming data according to the disclosed embodiments.

Each viewing window may incorporate its own user-controllable GIS viewing application 176, allowing the console operator to view a plurality of viewing windows simultaneously, each with its own visualized location data. FIG. 12 illustrates a screen shot of a viewing monitor 180 showing a viewing window of a client device capturing a moving police car in Herndon, Va., where the console operator has elected to view a separate map showing the car's available location.

In addition, as described further below and according to an embodiment of the present invention, the command center operator may have additional options to analyze and distribute the live imagery originating from any fixed camera 6, including, for example, the ability to connect to and cause one or more client devices to display the live imagery. Alternatively and/or additionally, the command center may be configured to capture and distribute to any client device any individual image frame, or collection of image frames, shown on the viewing window.

C. Transparency Controls

The command center operator has other viewing options as well when displaying a live image stream from a fixed camera 6 according to an exemplary embodiment. For example, a viewing window may have variable transparency for enhanced viewing of and overlaying with the underlying fixed imagery.

For example, the viewing window may employ a control such as a slide control that causes the viewing window to be rendered transparent in degrees as the control is moved one way and to be returned to its original transparency, including opaque, as the slide control is moved another way. When the streamed live images are displayed with some degree of transparency, the underlying fixed image may be seen beneath the live streamed images.

D. PTZ Controls

As with the client devices mentioned earlier, the command center operator may remotely access any available PTZ controls for a fixed camera 6 to the extent that the relevant information is contained in camera catalog 115. The viewing window may employ a control—such as a menu item, buttons or other prompts—to display the available PTZ options and allow the command center operator to exercise them.

E. Mobile User Monitoring Function

In one embodiment, each time the desktop application 20 is launched, the management console may automatically poll the command center server 12 and present a list of all the client devices that have previously registered with the system 100.

The available information for each client device may be displayed on the management console in various ways, such as, for example, by displaying each client device as a separate row in a user table. The user table is an exemplary interface that may allow a command center operator to interact with each client device.

The user table may also include one or more configurable columns displaying the status of each client device in the system 100, such as, for example, a transmit column, a watch column, a panic column, a tracking column, and one or more types of check-in status columns. As described further below, the information contained in the user table for each client device may be derived primarily from the last known table 96 in accordance with one embodiment. In addition, the management console may be configured to interface with the last known table 96 at designated time intervals in order to update the information contained in the user table.

The transmit column may indicate whether the transmit function 58 is engaged on the client device.

The watch column may indicate whether the watch function 59 view mode is engaged on a client device. In one embodiment, the command center operator may then select that client device to determine specifically what fixed camera 6 or other client device is originating the image stream being viewed through the watch function 59.

The panic column may indicate whether the panic function 59 view mode is engaged on the client device. As noted earlier, launching the panic function 59 may cause the client device to execute or perform the transmit function 58, which may, in turn, provide an indication on the user table.

The location column may indicate whether the client device is transmitting location data to the command center server 12 (which, as noted earlier, may be accomplished through the location subfunction in the configuration function 55 in one embodiment).

The tracking column may allow the command center operator to select one or more client devices to be tracked on one or more GIS viewing applications 176 whenever those devices are transmitting their location data. For example, an operator may select two client devices for tracking that have not communicated with the check-in service 110 for the last 24 hours. In one embodiment, as soon as either or both of the client devices establish a connection to the check-in service 110 and begin transmitting their respective location data, the applicable GIS viewing application 176 may automatically orient itself to show the device location(s).

The check-in status columns may provide various status reports about a particular client device, such as whether the client device is then communicating with the check-in service 110 or the period of time that has elapsed since the device last communicated with the check-in service 110, and so on.

In an exemplary embodiment, the management console may also include various filtering and sorting options, including, for example, the ability to filter by status or keyword, to sort by clicking on a column header, or to group by a particular field.

In addition, those skilled in the art will recognize that any number of additional or different methods and user interfaces can be incorporated into the management console to organize and highlight particular information to a command center operator. By way of example, various indicators, such as pop-up windows, audio prompts, different color schemes etc. may be incorporated into the management console to, for example, alert the console operator that a particular client device has undertaken a particular action (e.g. provide a notification as soon as "X" client device engages its transmit function 58) or has failed to undertake a particular action, etc.

(e.g., provide a notification if "X" client device has not communicated with the check-in service 110 within a designated period of time).

F. Client Viewing Options

When the transmit function 58 is engaged on one or more client devices, the command center operator may employ various methods to view the live image streams. In one embodiment, the command center operator may manually select the particular client device or devices for immediate viewing or the management console may be configured so that viewing monitor 180 automatically displays the live video streams as soon as the transmit function is engaged.

As described further below, in an exemplary embodiment, the desktop application 20 may access the live image stream as it is being transmitted from the client device and stored temporarily in the image buffer 87 (as shown on the preceding FIG. 3C) on the command center server 12, open a viewing window on the viewing monitor 180, and display the live image stream in the viewing window. As noted earlier in the case of a live image stream from a fixed camera 6, and as described in greater detail below, a separate image buffer embedded in the viewing window may record the live image stream from the client device and allow the command center operator to exercise various playback and distribution functions according to an embodiment of the present invention.

In addition, if the client device is also transmitting location data, the command center operator may cause the desktop application 20 to retrieve the coordinates from the last known table 96 and display those coordinates on the integrated GIS viewing application(s) 176. In addition, the desktop application 20 may cause the GIS viewing application(s) 176 to reorient themselves as those coordinates are updated in the last known table 96 during each subsequent communication between the client device and the command center server 12. Thus, if a client device is streaming live imagery from a moving car, for example, the viewing monitor 180 may show the underlying fixed imagery moving in sync with the vehicle's ongoing route with an icon showing the location of the client device as the location changes. As described further below and in one exemplary embodiment, the command center operator may also retrieve an archived image stream and display on the viewing monitor 180 how the client device's physical position changed during the course of capturing and transmitting that archived image stream.

Further, if there is available location data for two or more client devices, the desktop application 20 may cause the GIS viewing application(s) 176 to display a separate location icon representing each selected client device. Based on the information provided to it by the desktop application 20, the GIS viewing application(s) 176 may compute and zoom to an altitude sufficient to display an area that includes all the location icons representing the selected client devices on the viewing monitor 180. The GIS viewing application display may be reoriented by the desktop application 20 as the available location data for those client devices is updated in the last known table 96.

IV. Messaging and Routing Method

A. Data Communication Methods

In one embodiment, the system 100 allows a command center operator or any client device to send messages, commands and other data files (all such communications being referred to generally as data communications) to and among client devices. As described further below, any number of data communications may be issued with respect to, among other things, the delivery of one or more data files to a client device, the retrieval of one or more data files from a client device or the remote control of the functionality of a client device.

In another embodiment, the command center PC 22 may also establish its own connection to the check-in service 110 and thus be treated as another client device in the system 100 for the purpose of transmitting and receiving data communications. As such, the command center PC 22 and any client device may establish a two-way communication channel in the system 100, including, for example, the ability to send text messages and other data to each other as described further below.

Set forth below for illustrative purposes are examples of some of the types of data communications that may be issued in the system 100. As further described below, each type of data communication may have a particular number assigned to it for easier processing in the system 100. In an exemplary embodiment, the data communications may be issued from a command center PC 22 or by using the client device command function 62 or a related function on the client device. In either case, as noted earlier and as illustrated by the preceding FIG. 5D, the data communication may be routed first to the message delivery service 111 based on the device ID of each selected client device, and then to the message queue 98 to await the next check-in with check-in service 110 by the selected devices. In one embodiment, the message queue 98 may be configured in different ways to manage the stored data communications, including, for example, the ability to allow a pending data communication to be recalled by its sender prior to the next check-in with the check-in service 110 or to be deleted automatically if the next check-in does not occur within a designated period of time.

As one of ordinary skill in the art may appreciate, the exact steps for initiating a data communication may vary depending on whether a command center PC 22 or a client device is issuing the command, allowing for, among other things, variations in the functionality of the underlying computing platform.

As with other aspects of the system 100, the user may use various methods to access the command functionality, including, for example, the use of drop-down menus, right-click menus, prompts and other methods available on the particular computing platform that is initiating the command. In another embodiment, the user may select one or more individual client devices, or a predetermined group of client devices, to receive a command simultaneously from the command center server 12. In a further embodiment, if a viewing window is open on a command center PC 22 or a client device, the user may access menu options embedded in the viewing window. In a further embodiment, a user may schedule a command to be executed at a designated future time.

In addition, the command center PC 22 (or the command function 62 on the client device) may be configured to allow a command to be accompanied by any number of optional separate notifications to the target client device. Depending on the functionality of the client device, for example, a command, such as a "distribute file" command referenced below, may be accompanied by a notification causing the client device to vibrate, to create an audible sound, to display a prompt etc. A command may also be accompanied by associated data, such as the identity of the sender and the date and time the sender initiated the delivery.

As also noted earlier, system 100 may include various access controls to regulate when, and under what circumstances, any party to the system 100 may exercise command and control functionality, and the system 100 is also designed to allow an organization to establish its own policy procedures to govern how a particular data communication may be issued by a command center operator or any client device.

1. Message Command

In one embodiment, a user may select a "message" command to send a text message within the system 100. Once the command has been selected, the user may, in one implementation of a user interface, be prompted first to input the text message (which may, among other potential variations, include inputting new text, retrieving a previous text message or selecting a prerecorded message), and then to select one or more client devices from a list of available devices.

Once the "message" command has been retrieved by a selected client device during its next check-in service 110, the text message may appear on the client device display screen without interrupting any other application that might then be running on the client device. For example, if the text message is sent while the client device is streaming live imagery to a command center server 12, the message may be displayed on the client device display screen without interrupting that image stream.

In one embodiment, the target client device may then use the command function 62 to respond to the incoming text message or to forward it (and any additional text message) to one or more other client devices.

2. Distribute File Command

In one embodiment, a user may select a "distribute file" command to distribute one or more data files within the system 100. By way of example, the data file may be an image file, an audio file (such as an audio file created by the user of a client device), a software application, or other type of file that the client device is natively capable of processing. Once the command has been selected, the user may, in one implementation of a user interface, be prompted first to select one or more data files and then to select one or more client devices from a list of available devices. As with the upload function 61, a data file may originate from numerous sources, including, for example, the client device itself (hard drive, flash drive, disc, DVD-ROM, etc.), or from another data collection source that is communicatively coupled to the client device, or from separate media such as a compact flash, SD card etc.

In one embodiment, once the file command is retrieved by the client device during the next check-in service 110, the client device may process the data file using a Web browser or other application available on the client device as follows:

- If the data file is something the Web browser may natively handle, such as an image or an HTML file, the Web browser may be opened to retrieve and view the data file on the client device display screen.
- If the file is something the Web browser cannot natively handle, such as a vCard or a software application, the client device may prompt its user to download the data file onto the client device. It may then be left to the client device operating system to process the file depending on the file type.

3. Camera On Command

In one embodiment, a user may select a "camera on" command to remotely cause a client device to engage its transmit function 58 and commence streaming live imagery to the command center server 12 without user intervention at the remote device. Once the command has been selected, the user may, in one implementation of a user interface, be prompted simply to select one or more remote client devices from a list of available devices.

According to one embodiment, once the "camera on" command is retrieved by the remote client device during the next check-in service 110, the client device may launch the transmit function 58 and commence streaming the live imagery to the extent, as noted earlier, that there is an available internal or external camera on the device.

4. Camera Off Command

In one embodiment, a user may select a "camera off" command to remotely cause a client device to terminate its transmit function 58 and cease streaming live imagery to the command center server 12 without user intervention at the remote device. As with the "camera on" command, once the "camera off" command has been selected, the user may, in one implementation of a user interface, be prompted simply to select one or more remote client devices from a list of available devices.

Once the "camera off" command is retrieved by the client device during the next check-in service 110, the client device may automatically terminate the transmit function 58.

5. Phone Call Command

In one embodiment, a user may select a "phone call" command to remotely cause a client device to initiate a telephone call without user invention at the remote device to the extent the target client device has available an internal or external phone functionality. The phone number may include, for example, a conference call bridge number, together with any applicable authorization codes or passwords, so that multiple callers may be connected automatically with each other. Once the command has been selected, the user may, in one implementation of a user interface, be prompted first to enter the phone number (including, for example, any additional numbers necessary to access a conference call bridge number) and then to select one or more remote client devices from a list of available devices.

Once the command is retrieved by the remote client device during the next check-in service 110, the client device may establish a wireless connection, dial the phone number and, among other potential variations, go into speaker phone mode.

6. Switch Users Command

In one embodiment, a user may select a "switch users" command to remotely cause a client device to engage its watch mode 59 viewing mode to display a live image stream from a designated fixed camera 6, another client device or another source. Once the command has been selected, the user may be prompted first to select the camera for viewing (this step may occur automatically if the user exercises this command from a viewing window that is then viewing the same camera), and then to select one or more remote client devices from a list of available devices.

Once the command is retrieved by the remote client device during the next check-in service 110, the client device may launch the watch function 59 viewing mode and display the live imagery from the designated camera.

7. Status Command

As noted earlier, a client device may be configured to deliver certain designated information at certain intervals to the check-in service 110, such as, for example, battery level, available broadband networks, signal strength, etc. In addition, a user may select a "status" command to remotely cause a client device to report additional, different, or the same information about the client device or about any other device that may be communicatively coupled with the client device. According to one implementation of a user interface, once the command has been selected, the user may be prompted to select one or more remote client devices from a list of available devices.

Once the command is retrieved by the remote client device during the next check-in service 110, the client device may, in one embodiment, report the requested information back to the check-in service 110 for processing within the system 100.

8. Kill Pill Command

In one embodiment, the client software installed on a client device may include a "kill pill" function that, when triggered, may cause all of the data on the client device to be deleted and the device to be restored to its original factory settings. For example, a "kill pill" may be used as a precaution in the event a client device is lost, stolen or otherwise compromised. In another embodiment, a user may select a "kill pill" command to remotely cause the kill pill function to be triggered on a client device. Once the command has been selected, the user may, in one implementation of a user interface, be prompted to select one or more remote client devices from a list of available devices.

Once the command is retrieved by the client remote device during the next check-in service 110, the client device may automatically trigger the kill pill functionality on the client software. In another embodiment, the kill pill command may be sent to the client device via another method that does not require the client device to be checking in, such as through the use of short messaging service (SMS). SMS is a technology well known to those of ordinary skill in the art and is not described further.

Other embodiments may combine the functionality of two or more commands, such as the message command and the live viewing command, into a single command.

B. Summary of Messaging and Routing

Figure 8A:
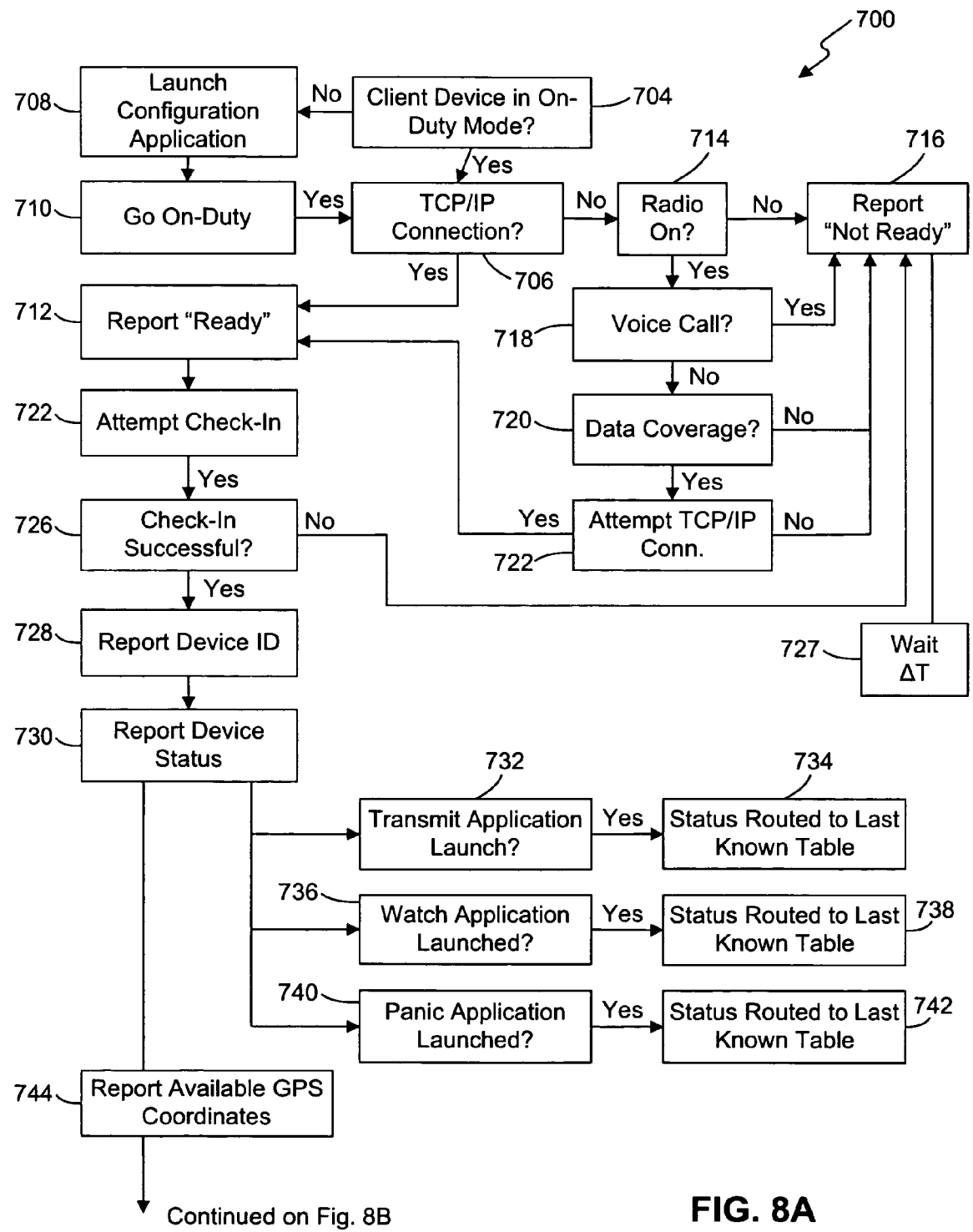
FIGS. 8A-8B illustrate a flow diagram summarizing an exemplary method by which messages, commands and other data are routed within the system shown in FIG. 1.
Figure 8B:
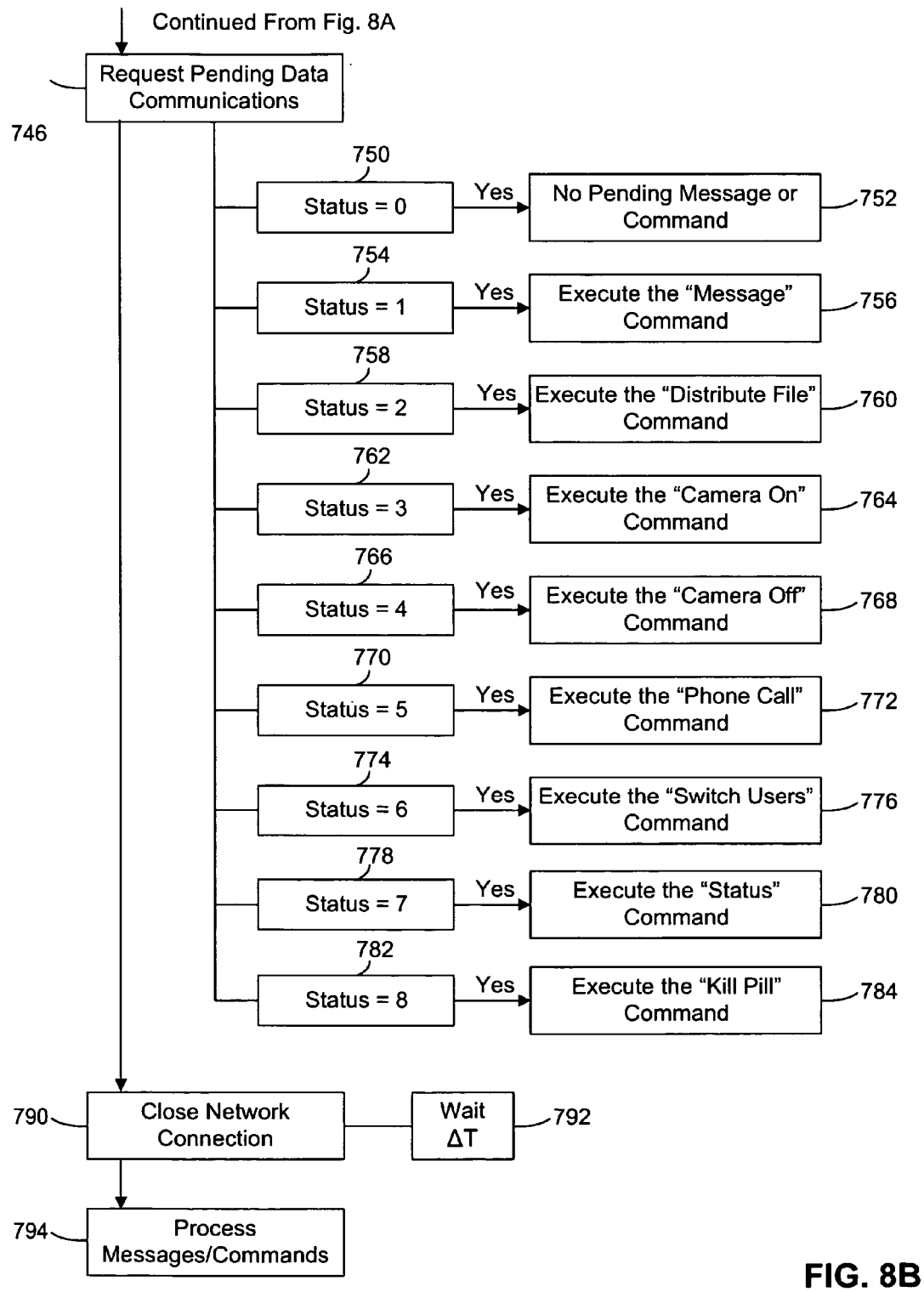

FIGS. 8A-8B illustrate a flow diagram showing a method 700 by which data communications are routed to, from and among client devices in the system 100 according to an embodiment of the present invention. As shown in FIGS. 8A-8B, method 700 begins in step 704 by determining whether a client device is in on-duty mode.

If the client is in on-duty mode ("yes" path from step 704), method 700 may proceed to step 706. If the client is not in on-duty mode ("no" path from step 704), the user of the client device may in step 708 launch the configuration function 55 and in step 710 select the displayed option to place the client device in on-duty mode. Once the client device is in on-duty mode ("yes" path from step 710), method 700 may proceed to step 706.

In step 706, method 700 may determine whether the client device has an open TCP/IP connection with a network allowing the client device to transmit and receive data. TCP/IP is a term well known to those of ordinary skill in the art of the present invention and is not described further in the interest of brevity. Alternatively, any other suitable data communication protocol may be used. If the client device has an open TCP/IP connection with a network ("yes" path from step 706), method 700 in step 712 may report an internal state of "ready" on the client device and, as described further below, attempt to initiate a network connection to the check-in service 110 (step 722). If the client device does not have an open TCP/IP connection with a network ("no" path from step 706), method 700 may proceed to assess whether the conditions are present to establish a network connection. Those skilled in the art will recognize that these conditions may vary depending on the specific client device. For example, different conditions may apply if the client device relies on a wired network 8 or a wireless network 4 and, if the latter, whether the client device relies on a commercial cellular network for wireless coverage as opposed to a Wi-Fi® wireless local area network or if the client device is configured with multiple types of RF circuitry 42. Thus, the following discussion of steps 714-722 is intended to provide illustrative examples of the conditions that may be assessed by method 700, according to one embodiment.

For example, in step 714 ("no" path from step 706), method 700 may determine whether the applicable RF circuitry 42 on the client device has been turned on. If the answer is no ("no" path from step 714), method 700 in step 716 may report an internal state of "not ready" on the client device. As described further below, for a designated period of time method 700 may stop attempting to initiate a network connection to the check-in service 110. According to one embodiment, the designated period of time between attempts may be the check-in time interval. As noted earlier, for example, the configuration function 55 may be configured with a check-in time interval of 15 seconds or some shorter or longer timeframe depending on an organization's specific requirements.

If the RF circuitry 42 on the client device is on ("yes" path from step 714), method 700 may determine in step 718 whether there is an active voice call taking place on the client device temporarily preventing the client device from establishing a TCP/IP connection. If the answer is yes ("yes" path from step 718), method 700 in step 716 may report an internal state of "not ready" on the client device. If the answer is no ("no" path from step 718), method 700 in step 720 may determine whether there is currently data coverage available via the applicable wireless network 4 or wired network 8. For example, if the client device is attempting to communicate via a commercial cellular network, method 700 in step 720 may determine whether the applicable wireless carrier's data network is available.

If data coverage is not available ("no" path from step 720), method 700 in step 716 may report an internal state of "not ready" on the client device. If data coverage is available ("yes" path from step 720), method 700 may attempt in step 722 to open a TCP/IP connection with the applicable data network. If that attempt fails ("no" path from step 722), method 700 in step 716 may report an internal state of "not ready" on the client device. If that attempt is successful ("yes" path from step 722), method 700 in step 712 may report an internal state of "ready" on the client device.

In one implementation of step 712, in each instance in which method 700 reports an internal state of "ready," the client device may attempt to initiate a network connection to the check-in service 110 (step 722) on its assigned command center server 12. Method 700 may then determine in step 726 whether that attempt is successful. If the answer is yes ("yes" path from step 726), method 700 may proceed to step 728, as described further below. If the answer is no ("no" path from step 726), method 700 in step 716 may report an internal state of "not ready" on the client device.

In step 726, once a successful connection has occurred to the check-in service 110, the client device may report its device ID and other designated information to the check-in service 110 (Step 728). The client device may then report its status to the check-in service 110 (Step 730), such as whether it is currently engaged in a specified activity. For example:

- If, as shown in step 732, the transmit function 58 is engaged on the client device, the check-in service 110 may in step 734 route that reported status to a specific entry for the device in both the last known table 96 and the position log 95.
- If, as shown in step 736, the watch function 59 is engaged on the client device, the check-in service 110 may in step 738 route that reported status to a specific (and different) entry for the device in both the last known table 96 and the position log 95.
- If, as shown in step 740, the panic function 57 is engaged on the client device 2 (and the corresponding transmit function 58, as described earlier), the check-in service 110 may in step 742 route that reported status to two separate entries (that is, one for the panic function and one for the transmit function) for the device both in the last known table 96 and in the position log 95.

In addition, according to one embodiment illustrated in FIGS. 8A and 8B, the client device 2 may in step 744 report its location data, such as its geospatial coordinates available from the location subfunction of the configuration function 55. As noted earlier, the reported location data may be received in multiple ways, including by the check-in service 110 or the transmit function 58, and routed to specific entries for the device in the last known table 96 and the position log 95.

Referring now to FIG. 8B, the client device may then in step 746 request all pending data communications from the check-in service 110. As described earlier and according to one embodiment of the present invention, these data communications may have been originated by a command center PC 22 or by another client device, and may be stored temporarily in the message queue 98 until they are retrieved by the check-in service 110 and delivered to the applicable client device. According to one embodiment, the data communications may be delivered to the client device in the order in which they first arrived in the message queue 98 or based on some other hierarchical ordering. By way of illustration, the command center server 12 may be configured, for example, so that the kill pill command (as described earlier) takes priority over all other pending data communication according to one embodiment.

According to one embodiment, each type of data communication in the system 100 may have its own numeric message status for identification purposes, and the check-in service 110 may report the existence of a particular data communication to the client device by identifying its numeric message status and by delivering any associated data necessary for the client device to execute that pending data communication.

Set forth below for illustrative purposes are examples of some of the numeric designations that may be assigned to some of the different types of data communications that may be issued in the system 100. As one of ordinary skill in the art will appreciate, actual nomenclature and numeric designations may vary in the system 100.

If, as shown in step 750, the message status=0, that may in step 752 ("yes" path from step 750) inform the client device that there are no pending data communications.

If, as shown in step 754, the message status=1, that may in step 756 ("yes" path from step 754) inform the client device to execute the "message" command described earlier.

If, as shown in step 758, the message status=2, that may in step 760 ("yes" path from step 758) inform the client device to execute the "distribute file" command described earlier.

If, as shown in step 762, the message status=3, that may in step 764 ("yes" path from step 762) inform the client device to execute the "camera on" command described earlier.

If, as shown in step 766, the message status=4, that may in step 768 ("yes" path from step 766) inform the client device to execute the "camera off" command described earlier.

If, as shown in step 770, the message status=5, that may in step 772 ("yes" path from step 770) inform the client device to execute the "phone call" command.

If, as shown in step 774, the message status=6, that may in step 776 ("yes" path from step 774) inform the client device to execute the "switch users" command described earlier.

If, as shown in step 778, the message status=7, that may in step 780 ("yes" path from step 778) inform the client device to execute the "status" command described earlier.

If, as shown in step 782, the message status=8, that may in step 784 ("yes" path from step 782) inform the client device to execute the "kill pill" command described earlier.

After the client device has received all of the pending data communications from the check-in service 110, it may in step 790 terminate the network connection to the check-in service 110, and the configuration function 55 may reset its internal timer for the next check-in time internal. This check-in, message-command retrieval cycle may repeat itself (step 792) until the client device is no longer in on-duty mode.

In the embodiment illustrated, after the client device has completed step 790, it may in step 794 proceed to execute each of the data communications received from the check-in service 110, for example, in the order in which they were delivered to it or based on some other hierarchical ordering.

In an alternate embodiment, the user of the client device may first receive a notification as to the number and nature of the data communications that have been delivered to the client device and be given the choice as to whether and to what extent the user wishes to allow those data communications to be executed on the client device.

V. Viewing and Distributing Data Files

A. Live Video Streams

As described further below, the command center operator and each user of a client device may have any number of options available to view and distribute live video streams. As with other aspects of the system 100, the precise scope of the options, and the manner in which options may be exercised, may vary depending on the functionality of the underlying computing platform and other variables.

1. Image Buffer

As noted earlier, the command center PC 22, and one or more client devices may open one or more separate viewing windows to display a live video stream from any fixed camera 6, any client device or other potential sources. In an exemplary embodiment, each viewing window may have a separate image buffer, which temporarily stores the live image stream as it is being received and gives the user multiple options to view, analyze and distribute the recorded image frames. As noted earlier, if a client device does not support separate viewing windows, the watch function 59 viewing mode (or another component of the client software) may incorporate its own separate image buffer.

Figure 9:
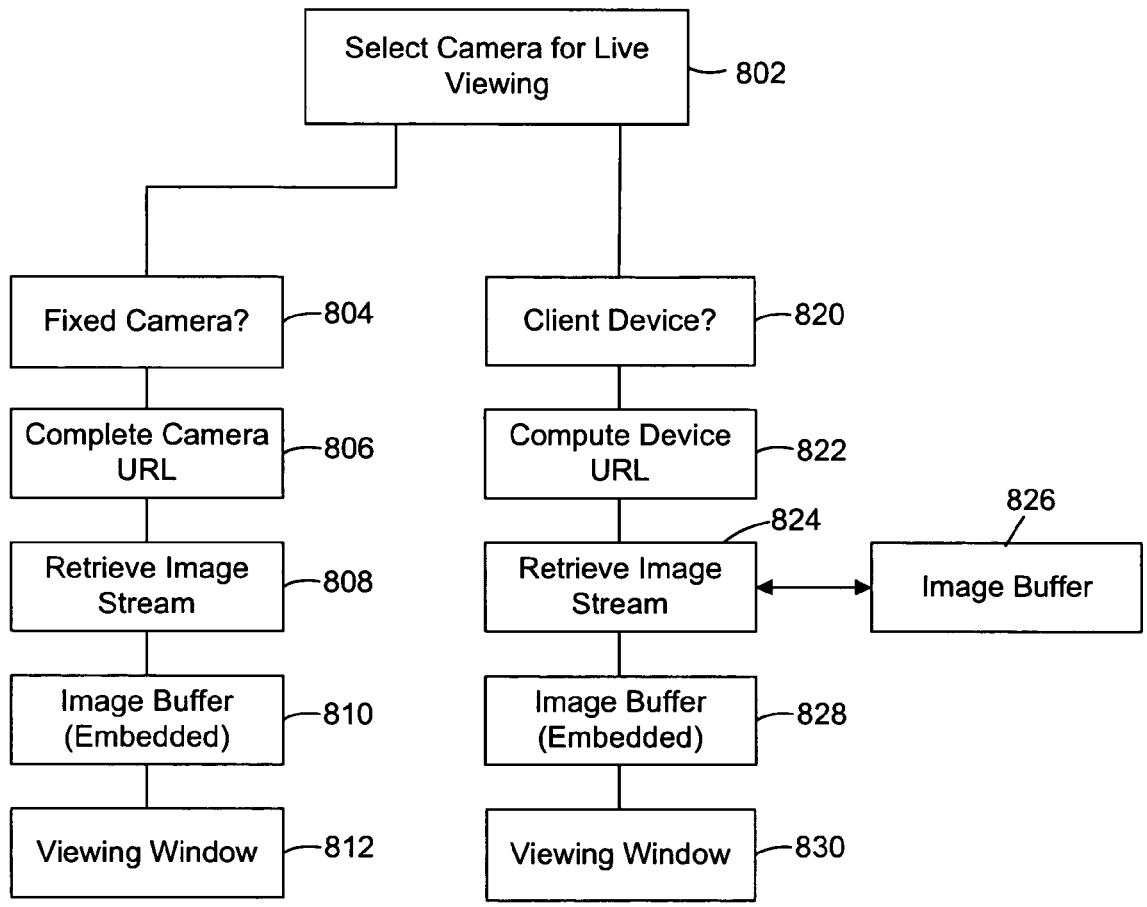
FIG. 9 illustrates an exemplary method for viewing and distributing live image streams in the system shown in FIG. 1.

FIG. 9 illustrates a flow diagram summarizing a method 800 by which a viewing window may receive a live image stream in the system 100 according to one embodiment. The image buffer functionality in method 800 may work in substantially the same manner whether the user is viewing a live image stream from a fixed camera 6 or a client device, but the process by which a viewing window receives the live image stream may vary depending on the source of the incoming image. For illustrative purposes, method 800 assumes that the client device supports a separate viewing window, but the method 800 may work in substantially the same manner if the image buffer functionality is otherwise incorporated into the client software as discussed earlier.

As shown in FIG. 9, method 800 may begin with the user of a command center PC 22 or a client device. Using any of the available selection methods previously described, the user may select one or more available fixed camera 6 or client devices (or other potential sources) for live viewing (Step 802).

If, in step 804, the user has selected a fixed camera 6 for viewing, then in step 806, the desktop application 20 (if the user is using a command center PC) or the watch function 59 viewing mode (if the user is using a client device) may, as noted earlier and according to one embodiment, compute the URL for the selected fixed camera 6, and in step 808 open an IP connection to that fixed camera 6 (or to any intervening command center server 12 proxy server incorporated into the system 100) to retrieve the live image stream. The incoming image live stream may then, in step 810, be received by, and temporarily stored in, a separate image buffer maintained in memory on the user's applicable command center PC 22 or client device. The image stream may be stored in the local image buffer on a frame-by-frame basis. In step 812 a separate viewing window may be opened as well to display the live image stream stored in that local image buffer.

If the user has instead selected a client device for viewing (step 820 in method 800), method 800 may, as described earlier, retrieve the device's live image stream from the command center server 12 image buffer 87 to which the live imagery is being sent. In that case, the desktop application 20 (if the user is using a command center PC) or the watch function 59 viewing mode (if the user is using a client device) may, as noted earlier and according to one embodiment, proceed in step 822 to compute the IP address of the relevant image buffer 87 based on the device ID of the transmitting client device and on the IP address of the corresponding command center server 12. With that computation, method 800 may in step 824 retrieve the image frames by (in step 826) establishing a connection to the relevant image buffer 87 and then in step 828 temporarily storing the retrieved frames in a separate image buffer maintained in memory on the user's applicable command center PC 22 or client device. The image stream may be stored in the local image buffer on a frame-by-frame basis in one embodiment. In step 830 a separate viewing window may be opened as well to display the live image stream stored in that local image buffer.

According to one embodiment, the user may open and view simultaneously multiple viewing windows, each of which may display a different live image stream, each being buffered in a separate local image buffer. As one of ordinary skill in the art will appreciate, design tradeoffs may establish a limit on the number of image frames that may be stored in a local image buffer at any one time, depending on the available memory on the command center PC 22 or client device and on other resource constraints. In one embodiment, a configurable storage limit may be set per image buffer, such as, by way of example, a storage limit of 3000 frames. As noted earlier, the image buffering process is known to those of ordinary skill in the art of the present invention, and is not described in greater detail in the interest of brevity.

2. Playback Controls

According to one embodiment, as the user is viewing the live image stream on the viewing window, the user may exercise various playback controls with respect to the image frames being stored in the embedded local image buffer, including the ability to pause, rewind and fast-forward through the locally stored image frames. For example, in one implementation of a user interface, the command center operator may use various methods to pause the image display, such as by the use of a designated "play/pause" button, a menu item, a slide control etc.

At that point, according to one implementation, the viewing window may display a single image frame (that image frame being referred to generally as a paused image frame) and the embedded local image buffer may continue to store the incoming video stream from the applicable fixed camera 6 or client device. According to one embodiment, the embedded image buffer may continue to store the incoming video stream until the viewing window is closed by the user or, if earlier, the embedded image buffer has reached a predetermined storage limit, as described previously.

If the user then selects the "play/pause" button a second time, the viewing window may display the live image stream from the point at which the pause first occurred, according to one embodiment. For example, if the command center operator is watching a live image stream and selects the pause button at a point where there are 50 image frames stored in the embedded image buffer and then selects the pause button a second time at a point where there are 200 image frames stored in the embedded image buffer, the viewing window may display the image stream from the $51^{st}$ image frame, not the $200^{th}$ frame. To display the live image stream from the 200th frame (or whatever is then the most current image frame being transmitted by the applicable camera), the user may, in one embodiment, use various methods to do so, such as by the use of a designated button, menu item, slide control etc.

Comparable controls may be used to exercise any number of other available playback controls as well, such as rewinding or fast-forwarding at varying speeds, according to one embodiment.

3. Distribution Controls

According to one embodiment, the user may also exercise various distribution options as well from the viewing window, including, among other potential options, the ability to distribute inside or outside the system 100 any one or more image frames being stored in the embedded local image buffer.

(a) Paused Image Frames.

In one illustrative implementation, if the user has paused an image stream on the viewing window, as noted above, the user may choose any number of menu items, user prompts or other methods to distribute that paused image inside or outside the system 100. Several examples of some of the types of distribution options that may be incorporated into the system 100 are described in detail below.

First, the user may distribute the paused image directly to one or more client devices. This option is one variation of the "distribute file" command mentioned earlier and functions in essentially the same fashion in the system 100, according to one embodiment. In one embodiment, the paused image frame is pre-selected as the desired data file to be distributed, and the user is then prompted to select one or more client devices to receive it. At that point, the "distribute file" command is routed to the message delivery service 111 to await the next connection to the check-in service 110 of the selected client device(s). When that next connection to the check-in service 110 occurs and the "distribute file" command is retrieved by a selected client device, the client device may implement the "distribute file" command by opening the device's Web browser and displaying the paused image frame on the display screen 33.

Second, the user may save the paused image frame to a file system. In one embodiment, the image frame may be assigned an initial file name automatically by the desktop application 20 (if the user is using the command center PC 22) or the client software (if the user is using a client device) and may be saved in the same or a different file format. After naming, the typical operating system procedures otherwise available on the applicable device, such as Windows XP® procedures, may control the completion of the saving process.

Third, the user may email the paused image. In one embodiment, the image frame may likewise be assigned an initial file name by the applicable desktop application 20 or client software, and the named file may appear automatically in an email attachment box. After naming, conventional email procedures, such as Microsoft® Outlook™ procedures, may control the completion and distribution of the email.

Fourth, the user may copy the image to a temporary file (e.g., the "clipboard"), such as a Windows clipboard file, for subsequent retrieval by pasting or attaching to any application that supports the clipboard, such as an image annotation software or a word processing software.

(b). Video Clip

In another illustrative implementation, the user may select a range of frames contained in the local image buffer (i.e. a video clip) and distribute that video clip inside or outside the system 100 in substantially the same manner as a paused image frame. In one embodiment, the user may use any of the available controls on the viewing window to first identify the first frame in the local image buffer the user wishes to include in the clip, then commence a recording function (such as, for example, through the use of a "record" button or other control) and then cease the recording at the last frame the user wishes to include in the clip (such as, for example, by selecting a "record" button or other control). At that point, the user may exercise any of the available distribution options in the system 100, including, as noted above, the ability to distribute the clip to one or more client devices, to save the clip to a file system, to email the clip etc.

B. Archived Data Files

As noted earlier, data files introduced into the system 100 may be stored in different ways on one or more command center servers 12 (or on one or more intervening command center servers 12 or on one or more available storage methods that are communicatively coupled to a command center server 12 etc.) depending on their particular characteristics. In the case of live image streams from a fixed camera 6, a client device or other source, for example, the incoming data files may be routed by the command center server 12 image service 80 on a frame-by-frame (or other basis) to the frames database 97 in the database application 74 for archiving and subsequent retrieval. As also noted earlier, associated data files such as location data and sensor data may be embedded into the archived image frames or stored separately in the system 100 but cataloged in a manner that permits the associated data to be retrieved automatically when the corresponding image frames are retrieved.

Stored image files and other associated and/or independent data files may be displayed in the system 100 in various ways, and the command center operator and each user of a client device may have any number of options available to search for, view and distribute the stored data files. Set forth below for illustrative purposes is one example of a user interface that may be implemented in the system 100 with respect to image frames stored in the frames database 97, according to one embodiment. As with other aspects of the system 100, the precise scope of the user interface, and the manner in which data files may be exercised, may vary depending on the functionality of the underlying computing platform and other variables.

1. Searching the Frames Database

In one embodiment, a user may select any number of methods available on a command center PC 22 or client device (pull-down menus, right-click menus, buttons etc.) to initiate a search of the frames database 97. As one of ordinary skill in the art will appreciate, any single search parameter, or combination of parameters, may be applied to find particular image frames in the frames database 97. Among other potential implementations, a user may be prompted to search by any one or more of the following parameters:

The identity of the source of the image frames (that is, the fixed camera 6, the client device or other source that first streamed the imagery)

Available location data (for example, by selecting a location on a map and requesting all image frames located within a certain distance of that location)

Date and/or time.

Priority tagging created by the sender (as noted earlier in the discussion of the transmit function 58).

Prior notations created by a user, such as labeling or bookmarking one or more archived image frames, as discussed further below.

The search function may incorporate various additional filtering and sorting options as well, including, for example, the ability to further refine search results.

Figure 10A:
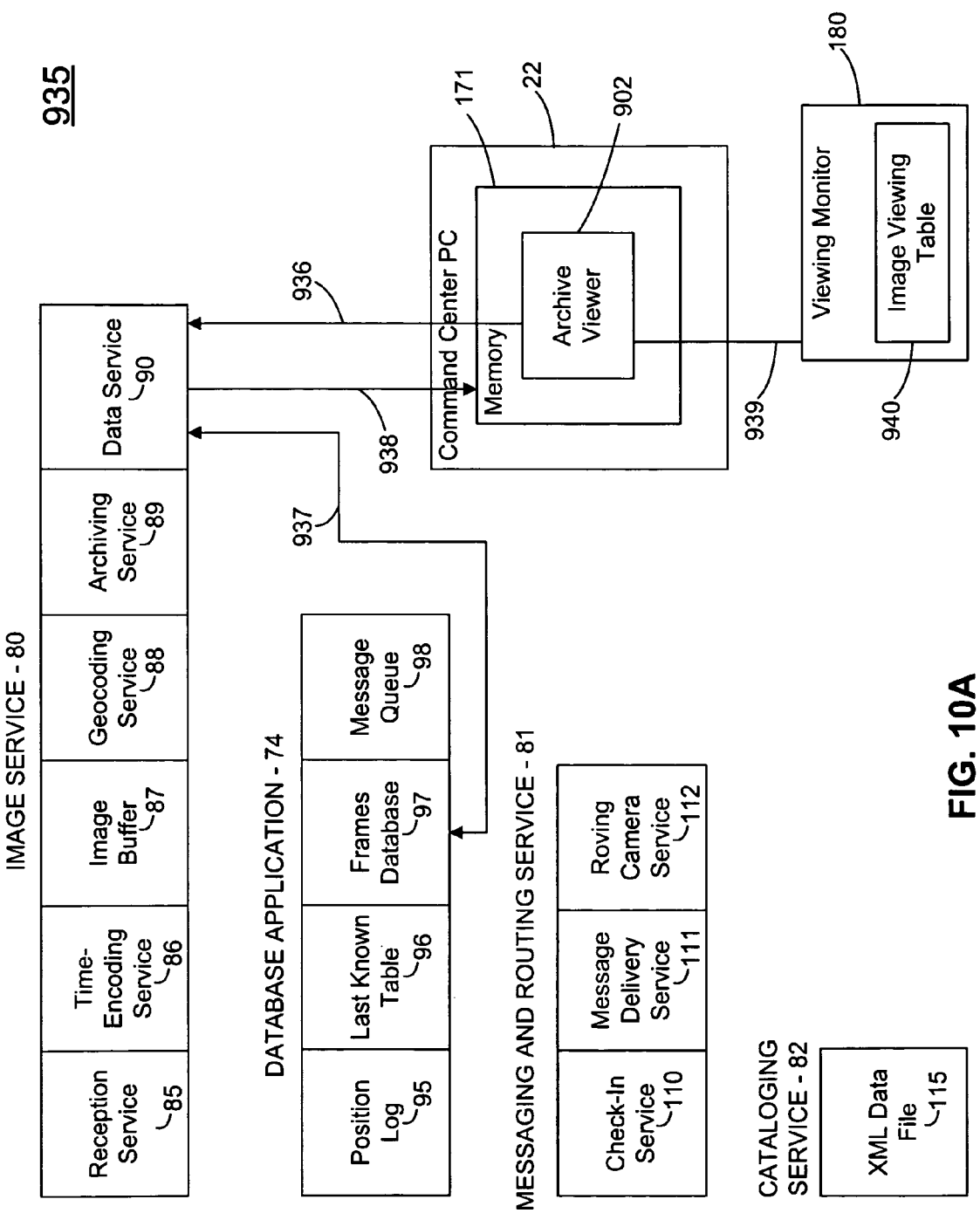
FIGS. 10A-10B illustrate exemplary methods for viewing and distributing archived image streams in the system shown in FIG. 1.

FIG. 10A is a schematic diagram of a data flow 935 illustrating one method by which a user may retrieve image frames (and the available associated data for those frames) from the frames database 97 after locating the frames with a search function, according to one embodiment.

As shown in the embodiment of FIG. 10A, the desktop application 20 (if a command center PC 22 is initiating the search) or the archive function 60 (if a client device is initiating the search) may in path 936 communicate with the data service 90 via a wired network 8 or a wireless network 4 (or a combination of the two) to request the available archived image frames based on the designated search parameters.

In path 937, the data service 90 may retrieve the requested frames and associated data from the frames database 97 or other source if, as noted earlier, the associated data is stored separately from, but otherwise associated with, designated image frames.

In path 938, the data service 90 may deliver the retrieved frames and data to an archive viewer 902, which may store the frames and associated data temporarily in memory on the user's applicable command center PC 22 or client device. In path 939, the archive viewer 902 may display the frames and associated data on the user's display screen in various formats, such as a table format 940, depending on the nature of the search results and other variables.

As noted earlier and according to one embodiment, the system 100 may allow a configurable limit on the number of image frames that may be stored locally in memory on the command center PC or a client device, depending on the available memory and other resource constraints. The same may hold true for the number of archived image frames stored in association with the archive display format.

2. Image Display Format

As explained, a table format 940 may be one embodiment of a user interface for displaying archived image frames. Among other potential display options, the table format 940 may include one or more configurable columns displaying information about each available archived image frame produced by the search function, such as, for example, one or more columns displaying:

Timestamps previously created by the system 100 for archived image frames, including, for example, the time the frame was first captured on the device and the time the frame was first delivered to the command center server 12.

The client device, fixed camera 6 or other source that first captured the image.

Available location data (longitude, latitude etc.) for that image frame.

The archived image frames.

Other associated data, such as sensor data, available for an image frame.

As described earlier, the information contained in table format 940 may be derived primarily from the last known table 96.

3. Distribution Options

As noted earlier, when a user of a command center PC 22 or a client device is viewing a live image stream in the system 100, any number of distribution options may be available to distribute any one or more of the incoming image frames inside or outside the system 100. In an exemplary embodiment, any one or more archived image frames displayed in the table format 940 may be distributed inside or outside the system 100 in substantially the same fashion. That is, as described earlier and among other potential distribution options, any one or more image frames may be:

- Distributed directly to one or more client devices (this option, as noted earlier, is one variation of the "distribute file" command and functions in essentially the same fashion in the system 100, according to one embodiment).
- Saved to a file system.
- Distributed by email.
- Copied to a clipboard
- Retrieved by third-party sources.

4. Displaying an Archived Image Stream

In addition to viewing still images, a user may also select any number of image frames in the table format 940 for display as streaming video, such as an M-JPEG video stream.

In one implementation of a user interface for archive viewer 902, the user may use any number of menu items or other controls to select any discrete frames or ranges(s) of frames from the table format 940 that the user wishes to include in the video steam. As described further below, a user may then select a "play" button or other control to open a viewing window and display the archived video stream, in one embodiment.

(a) The Archive Viewer

As noted earlier, when a user of a command center PC 22 or a client device is viewing a live image stream in the system 100, the user may open and view simultaneously multiple viewing windows, each of which may display a different video image stream, each being buffered in a separate local image buffer. In an exemplary embodiment, a substantially similar method may be used to view an archived video stream. As noted earlier, in an alternative embodiment, if a client device does not support separate viewing windows, the watch function 59 viewing mode (or another component of the client software) may incorporate its own separate image buffer.

Figure 10B:
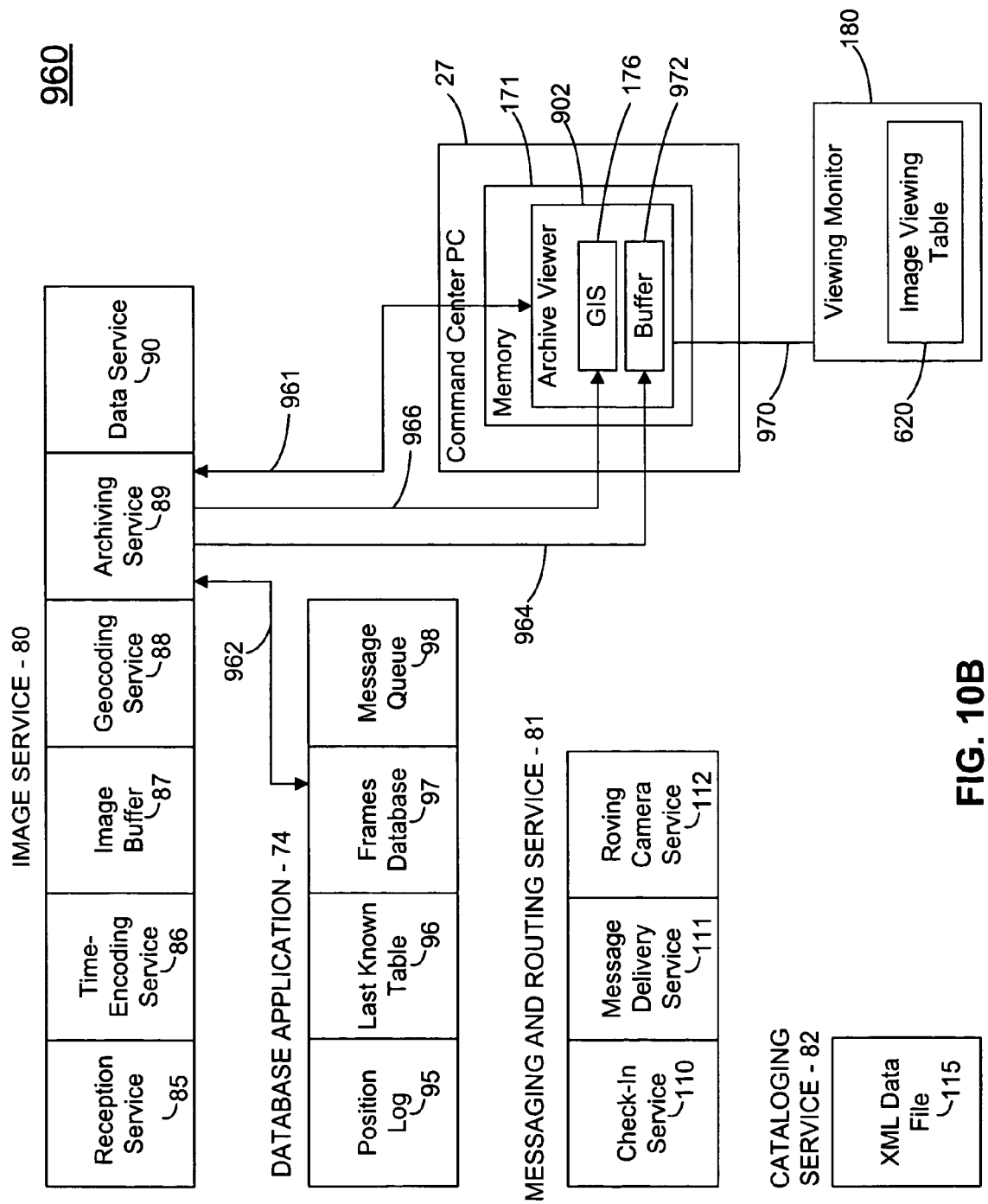

FIG. 10B is a diagram illustrating a data flow 960 by which a user may retrieve an archived image stream and other associated data (as noted earlier) from the frames database 97 to display as streaming video through the archive viewer 902, according to one embodiment.

As illustrated by FIG. 10B, the archive viewer 902 may in path 961 communicate with the archiving service 89 via a wired network 8 or a wireless network 4 (or a combination of the two) to request designated archived image frames, as described previously.

The image service 89 may in path 962 retrieve from the frames database 97 the available image frames, which frames may, as noted earlier, have additional data, such as location data, encoded into them or otherwise stored separately but associated with them.

The archiving service 89 may also in path 964 reformat the retrieved image frames as a video stream, such as an M-JPEG video stream, and route that reformatted image stream to a separate image buffer 972 maintained temporarily in memory on the user's applicable command center PC 22 or client device. Path 961 may be used to send some associated information to archive viewer 902.

In path 966, available location data (and other suitable data) may be routed by the archiving service 89 to one or more GIS applications 176 that may be integrated into the archive viewer 902, according to one embodiment.

If there is available location data, the archive viewer 902 may, as noted earlier in the context of viewing live video streams, be configured in different ways to allow the user to visualize the location data, in one embodiment. Among other potential visualization options:

- One or more GIS viewing applications 176 (as described earlier) may be engaged to display the available location data.
- The viewing window may manually or automatically be opened on top of its available location data in order to better visualize how the archived video stream appears against the underlying fixed imagery, such as a satellite or aerial photo or other available display from a GIS viewing application 176.
- Each viewing window may incorporate its own user-controllable GIS viewing application 176, allowing the user to view simultaneously a plurality of viewing windows, each with its own visualized location data.

In path 970, the archive viewer 902 may open a viewing window to display the image stream buffered in image buffer 972. In addition, if location data has been routed to a GIS application 176 (step 966), the archive viewer 902 may, in one potential implementation, cause the GIS application 176 to use numeric placemarkers or other indicators give a display of geographic context, such as a location on an aerial photo or map, indicating the location from which archived video imagery was originally transmitted to the command center server 12.

(b) Playback Controls

As with the displaying of a live image stream on a viewing window, the user may exercise playback controls when viewing an archived image stream on a viewing window, according to one embodiment. For example, in one exemplary user interface for archive viewer 902, the user may use various controls, such as a "play/pause" button, menu item, slide control etc., to invoke the functionally described previously with respect to the playback controls for viewing a live image stream.

(c) Distribution Controls

As with distributing an image frame from a live video feed described previously, the user may exercise the same types of distribution controls when viewing an archived image stream on a viewing window, according to one embodiment. For example, in one exemplary user interface for archive viewer 902, the use may pause an archived image stream using a "play/pause" button or other control and distribute the paused image frame inside or outside the system 100 in substantially the same fashion, such as by distributing it directly to one or more client devices, saving it to a file system, distributing by email or copying to a clipboard.

In addition, the user may select a range of frames contained in the local image buffer (i.e. a video clip) and distribute that video clip inside or outside the system 100 in substantially the same manner as a paused image frame.

(d) Switch Users Command

Further, the user may cause one or more client devices to display the same archived video stream created by that user, in one embodiment. This option is one variation of the "switch users" command mentioned earlier and functions in essentially the same fashion. Once the command has been selected, the user may, in one implementation of a user interface, be prompted to select one or more client devices from a list of available devices. Once the command is retrieved by a selected client device during the next check-in service 110, the client device may launch the watch function 59 viewing mode and display the archived stream.

VI. Populating the Camera Catalog

As noted earlier, camera catalog 115 for a command center server 12 may maintain an entry for each fixed camera 6 that an organization wishes to incorporate into the system 100, according to one embodiment. As one of ordinary skill in the art may appreciate, camera catalog 115 may be populated in any number of ways within the scope of the invention. For example, if the organization already has that data available in some format, such as a Microsoft Excel® spreadsheet or some other application format, that data may be imported into camera catalog 115. In addition, among other methods, the system 100 may have a separate Web-based method to populate and update the information contained in camera catalog 115, according to one embodiment.

An exemplary embodiment of a user interface for such a Web-based application may allow a user to select a control shown on the management console, which may cause a Web page to open accessing the cataloging service 82. The Web page may retrieve from the cataloging service 82 and display a list of fixed cameras 6 currently maintained in camera catalog 115. To change the information in camera catalog 115, the user (e.g., command center operator or other authorized personnel) may, among other potential options and according to one embodiment:

Select a camera from the resulting list and edit its existing data.

Select a different menu option to add a new fixed camera 6 and to populate the relevant camera catalog 115 fields with the available information for that camera, such as, for example, its available location data, PTZ controls, etc. (all as described earlier).

Select a different menu option to delete an existing fixed camera 6.

It is contemplated that additional and/or different methods for how data is stored in camera catalog 115 may exist without departing from the scope of the present disclosure. For example, an organization may define its own fields in the camera catalog and specific attributes associated with these fields.

VII. Third-Party Integration

According to one embodiment of the present invention, the server software 14, the mobile client software, the desktop client software 3 and other components of the system 100 may include their own respective application programming interfaces to allow for integration with a variety of third-party products and systems, such as, for example, existing third-party imagery databases, video surveillance tools and infrastructures, third-party alerting and messaging systems, and artificial intelligence solutions, such as facial and object recognition applications.

VIII. Security and Exemplary Embodiments

As noted earlier, systems and methods consistent with the invention may be designed to incorporate various security features, including access controls, virtual private networks (VPNs) and other encryption technologies, and user verification and authentication.

It is contemplated that various component and/or subsystems associated with the disclosed data acquisition and distribution system may be included as part of a separate system or may be integrated within one or more other systems. For example, it is contemplated that the processes and/or systems associated with command center PC 22 may be implemented on one or more mobile client devices, designated to operate as the command center PC 22. Alternatively and/or additionally, although FIG. 2A illustrates certain components as components external to mobile client device 2 (e.g., RF external adapter and external GPS receiver), it is contemplated that these components may be integrated within mobile client device 2, without departing from the scope of the present disclosure and the embodiments associated therewith.

Similarly, it is contemplated that various processes illustrated and/or described as being associated with certain components and/or systems may be associated with other components and/or systems. For instance, it is contemplated that certain processes performed by command center PC 22 may be performed by one or more client devices. Accordingly, it is contemplated that any feature, process, and/or system associated with command center PC 22 may be associated with a client device. Thus, one or more client devices may be designated as a command server for performing the command and control processes associated with the disclosed embodiments.

Furthermore, although certain components or systems may be described as being "mobile", it is contemplated that this term may also refer to fixed devices that may be configured as "mobile" or "virtually mobile" devices. For example, throughout the disclosure, reference is made to mobile client devices. It is contemplated that this term may refer to desktop and/or network clients configured, with certain software such as mobile client software, to possess many of the same functionalities as the mobile client device.

The present invention has been described with reference to certain exemplary embodiments thereof. However, it will be readily apparent to those skilled in the art that it is possible to embody the invention in specific forms other than that those of the exemplary embodiments described above. This may be done without departing from the spirit and scope of the invention. The exemplary embodiments described herein are merely illustrative and should not be considered restrictive in any way.

What is claimed is:

1. A method comprising:
by a first mobile client device:
receiving a first selection of one of a plurality of mobile streamable-data sources configured to transmit approximately real-time streamable data, the selected one of the mobile streamable-data sources being a mobile video source;
receiving a second selection of one of a plurality of second mobile client devices to receive all or a portion of the streamable data from the selected one of the mobile streamable-data sources; and
transmitting the first and second selections in one or more commands to one or more central servers; and
by the central servers:
receiving the commands; and
in response to the commands:
transmitting or causing to be transmitted all or a portion of the streamable data from the selected one of the mobile streamable-data sources to the selected one of the second mobile client devices for use at the selected one of the second mobile client devices;

transmitting or causing to be transmitted to the selected one of the second mobile client devices geographic data corresponding to a geographic region around and including a dynamic geographic location of the selected one of the mobile streamable-data sources; and presenting or causing to be presented through a second display at the selected one of the second mobile client devices:

a first window for displaying the geographic data; and a second window for presenting the all or a portion of the streamable data from the selected one of the mobile streamable-data sources.

2. The method of claim 1, wherein transmitting or causing to be transmitted all or a portion of the streamable data from the selected one of the mobile streamable-data sources comprises causing the selected one of the mobile streamable data sources to collect and transmit the streamable data.

3. The method of claim 2, wherein transmitting or causing to be transmitted all or a portion of the streamable data from the selected one of the mobile streamable data sources further comprises causing the selected one of the mobile streamable data sources to stop collecting and transmitting.

4. The method of claim 1, further comprising, by the central servers, causing the selected one of the mobile streamable data sources to place a phone call without interaction from a user at the selected one of the mobile streamable data sources.

5. The method of claim 1, wherein the streamable data comprises one or more of streaming video data, streaming audio data, text message data, still image data, location data, sensor data, or graphical data.

6. The method of claim 5, wherein the sensor data comprises one or more of environmental data, temperature data, radiation data, or chemical concentration data.

7. The method of claim 1, wherein the first mobile client device is a command console.

8. The method of claim 1, claim 1, wherein the first mobile client device is a wireless telephone, a smartphone, a pocket personal computer system, or a laptop computer system.

9. The method of claim 1, further comprising, by the central servers, deleting or causing to be deleted data at the selected one of the mobile streamable data sources.

10. The method of claim 1, further comprising restoring or causing to be restored the selected one of the mobile streamable data sources to its factory settings.

11. The method of claim 1, further comprising:

by the first mobile client device:

receiving a third selection of one or more predefined operations for the selected one of the second mobile client devices to execute; and transmitting the third selection in the commands to the central servers; and by the central servers, in response to the commands, causing the selected one of the second mobile client devices to execute the predefined operation.

12. The method of claim 11 further comprising, by the central servers:

temporarily storing one or more of the commands in one or more message queues while waiting for the selected one of the second mobile client devices to access a check-in service at the central servers during a real-time media session involving streamable data to or from the first mobile client device or the selected one of the second mobile client devices; and in response to the selected one of the second mobile client devices accessing the check-in service, transmitting or causing to be transmitted to the selected one of the second mobile client devices the one or more of the commands for execution by the selected one of the second mobile client devices automatically and without input from a user at the selected one of the second mobile client devices.

13. The method of claim 12, wherein the selected one of the second mobile client devices at least attempts to access the check-in service periodically according to a predetermined time interval if the second mobile client device is in an on-duty mode.

14. The method of claim 13, wherein the selected one of the second mobile client devices accesses the check-in service to report to the check-in service an identifier (ID) of the selected one of the second mobile client devices.

15. The method of claim 12, wherein the selected one of the second mobile client devices at least attempts to access the check-in service if a predetermined event occurs and the selected one of the second mobile client devices is in an on-duty mode.

16. The method of claim 15, wherein the selected one of the second mobile client devices accesses the check-in service to report to the check-in service:

a status of the selected one of the second mobile client devices; or a location of the selected one of the second mobile client devices.

17. The method of claim 16, wherein the location of the selected one of the second mobile client devices is specified by Global Positioning System (GPS) coordinates.

18. The method of claim 16, wherein the status of the selected one of the second mobile client devices indicates whether a transmit function, a watch function, or an alert function is engaged on the selected one of the second mobile client devices.

19. The method of claim 1, wherein the second window is adjacent, at least in part, to one or more portions of the first window.

20. The method of claim 1, wherein the second window overlies, at least in part, one or more portions of the first window.

21. The method of claim 20, wherein:

the second window is smaller than the first window; and at least a portion of the second window is at least approximately centered over a position in the first window corresponding to the geographic location in the geographic region.

22. The method of claim 1, wherein the geographic data comprises fixed-location imagery corresponding to the geographic region.

23. The method of claim 22, wherein the fixed-location imagery comprises satellite imagery or aerial imagery corresponding to the geographic region.

24. The method of claim 1, wherein the second mobile client device is a wireless telephone, a smartphone, a pocket personal computer system, or a laptop computer system.

25. The method of claim 1, wherein the streamable data comprises:

video;

audio;

position data specifying a position of the selected one of the mobile streamable data sources; or metadata.

26. The method of claim 1, wherein the selected one of the mobile streamable data sources comprises a still-picture camera or a video camera.

27. The method of claim 26, wherein the still-picture camera or the video camera is configured to pan, tilt, or zoom.

28. The method of claim 1, wherein the selected one of the mobile streamable data sources comprises a camera integrated with or communicatively coupled to a mobile client device.

29. The method of claim 1, wherein the selected one of the mobile streamable data sources is a mobile streamable-data store.

30. The method of claim 1, wherein transmitting or causing to be transmitted all or a portion of the streamable data to the selected one of the second mobile client devices comprises transmitting one or more instructions to the selected one of the second mobile client devices, the one or more instructions being configured to cause the selected one of the second mobile client devices to open a window for making available all or a portion of the streamable data at the selected one of the second mobile client devices automatically and without input from a user at the selected one of the second mobile client devices.

31. The method of claim 1, wherein:
the method further comprises, by the central servers, uploading or causing to be uploaded all or a portion of the streamable data to a streamable-data store for storage; and
transmitting or causing to be transmitted all or a portion of the streamable data to the selected one of the second mobile client devices comprises transmitting one or more instructions to the selected one of the second mobile client devices, the one or more instructions being configured to cause the selected one of the second mobile client devices to retrieve all or a portion of the streamable data from the streamable-data store.

32. The method of claim 1, wherein:
the selected one of the mobile streamable data sources is a viewing window that overlies one or more portions of one or more display elements on a display of the first or another client device, the one or more portions of the one or more display elements being viewable to a user at the first or other client device through the viewing window; and
the streamable data is a video feed capturing the one or more portions of one or more of the display elements underneath the viewing window.

33. The method of claim 32, wherein the one or more portions of one or more of the display elements underneath the viewing window appear through the viewing window to the user at the first mobile or other client device as they would appear to another user at the selected one of the second mobile client devices on being transmitted to it.

34. The method of claim 32, wherein, on being transmitted, the one or more portions of one or more of the display elements underneath the viewing window appear to another user at the selected one of the second mobile client devices with one or more different ones of the portions of one or more different ones of the display elements having different resolutions from their native resolutions at the first mobile or other client device.

35. The method of claim 32, wherein:
the viewing window is movable by the user at the first mobile or other client device with respect to the display elements to overlie one or more other portions of one or more of the display elements; and
the video feed captures the one or more other portions of one or more of the display elements underneath the viewing window as it moves.

36. The method of claim 35, wherein one or more of the display elements each comprise an application window.

37. The method of claim 36, wherein one or more of the application windows each comprise a web-browser window or a media-player window.

38. The method of claim 32, wherein one or more of the display elements comprise one or more portions of a virtual desktop of the first mobile or other client device.

39. The method of claim 32, wherein one or more of the display elements each comprise an icon appearing on a virtual desktop of the first mobile or other client device.

40. A system comprising:
a first mobile client device that is configured to:
receive a first selection of one of a plurality of mobile streamable-data sources configured to transmit approximately real-time streamable data, the selected one of the mobile streamable-data sources being a mobile video source;
receive a second selection of one of a plurality of second mobile client devices to receive all or a portion of the streamable data from the selected one of the mobile streamable data sources; and
transmit the first and second selections in one or more commands to one or more central servers; and
the central servers, configured to:
receive the commands; and
in response to commands:
transmit or cause to be transmitted all or a portion of the streamable data from the selected one of the mobile streamable data sources to the selected one of the second mobile client devices for use at the selected one of the second mobile client devices;
transmit or cause to be transmitted to the selected one of the second mobile client devices geographic data corresponding to a geographic region around and including a dynamic geographic location of the selected one of the mobile streamable-data sources; and
present or cause to be presented through a second display at the selected one of the second mobile client devices:
a first window for displaying the geographic data; and
a second window for presenting the all or a portion of the streamable data from the selected one of the mobile streamable-data sources.

* * * * *